United States Patent
Goh et al.

(10) Patent No.: US 10,280,534 B2
(45) Date of Patent: May 7, 2019

(54) METHOD AND COMPOSITION FOR DEPOLYMERIZATION OF CURED EPOXY RESIN MATERIALS

(71) Applicant: Korea Institute of Science and Technology, Seoul (KR)

(72) Inventors: Munju Goh, Wanju-gun (KR); Bon-Cheol Ku, Wanju-gun (KR); Nam Ho You, Wanju-gun (KR); Sang Jun Youn, Wanju-gun (KR); Hyeonuk Yeo, Wanju-gun (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/126,580

(22) Filed: Sep. 10, 2018

(65) Prior Publication Data
US 2019/0010631 A1    Jan. 10, 2019

Related U.S. Application Data

(63) Continuation of application No. 15/187,062, filed on Jun. 20, 2016.

(30) Foreign Application Priority Data

Jul. 22, 2015  (KR) .......................... 10-2015-0104002
Mar. 14, 2016  (KR) .......................... 10-2016-0030526

(51) Int. Cl.
*C01F 7/02*  (2006.01)
*C03C 13/00*  (2006.01)
(Continued)

(52) U.S. Cl.
CPC ............. *D01F 9/24* (2013.01); *C01B 32/16* (2017.08); *C01B 32/184* (2017.08); *C01B 32/23* (2017.08);
(Continued)

(58) Field of Classification Search
None
See application file for complete search history.

(56) References Cited

U.S. PATENT DOCUMENTS

| 3,716,325 A * | 2/1973 | Aspland | ................... D06P 1/30 540/140 |
| 3,866,347 A * | 2/1975 | Schoom | .............. A01M 1/2055 424/416 |

(Continued)

FOREIGN PATENT DOCUMENTS

| CN | 101407596 A | 4/2009 |
| CN | 102391543 A | 3/2012 |

(Continued)

OTHER PUBLICATIONS

European Office Action dated Oct. 29, 2018 in related European Patent Application No. 16175528.5 (3 pages in English).

(Continued)

*Primary Examiner* — Joseph D Anthony
(74) *Attorney, Agent, or Firm* — NSIP Law

(57) ABSTRACT

A cured epoxy resin material is depolymerized by using a composition including a compound represented by the chemical formula of $XO_mY_n$ (wherein X is hydrogen, alkali metal or alkaline earth metal, Y is halogen, m is a number satisfying $1 \le m \le 8$ and n is a number satisfying $1 \le n \le 6$), and a reaction solvent, wherein X is capable of being dissociated from $XO_mY_n$ and Y radical is capable of being produced from $XO_mY_n$ in the reaction solvent. It is possible to carry out depolymerization of a cured epoxy resin material, for example, at a temperature of 200° C., specifically 100° C. or lower, and to reduce processing cost and energy requirement. It is also possible to substitute for a reaction system using an organic solvent as main solvent, so that the contamination problems caused by the organic solvent func- (Continued)

tioning as separate contamination source may be solved and environmental contamination or pollution may be minimized.

18 Claims, 26 Drawing Sheets

(51) Int. Cl.
| | |
|---|---|
| D01F 9/24 | (2006.01) |
| C01B 32/16 | (2017.01) |
| C01B 32/956 | (2017.01) |
| C01B 32/184 | (2017.01) |
| C01B 32/23 | (2017.01) |
| C08J 11/16 | (2006.01) |

(52) U.S. Cl.
CPC .............. *C01B 32/956* (2017.08); *C01F 7/02* (2013.01); *C03C 13/00* (2013.01); *C08J 11/16* (2013.01); *C08J 2363/00* (2013.01); *Y02W 30/705* (2015.05)

(56) References Cited

U.S. PATENT DOCUMENTS

| | | | | | |
|---|---|---|---|---|---|
| 4,087,515 | A | * | 5/1978 | Miller | C01B 11/10 423/102 |
| 4,296,103 | A | * | 10/1981 | Laso | A61K 33/40 424/613 |
| 4,526,700 | A | * | 7/1985 | Hensley | C11D 3/42 252/186.2 |
| 4,623,476 | A | * | 11/1986 | Nayar | C11D 3/3956 252/187.26 |
| 4,775,492 | A | * | 10/1988 | Vipond | C11D 3/2079 252/187.26 |
| 5,051,252 | A | * | 9/1991 | Schultz | A61K 8/20 132/204 |
| 6,127,573 | A | * | 10/2000 | Li | C07C 51/29 562/409 |
| 6,387,321 | B1 | * | 5/2002 | McGill | C11D 3/3942 422/5 |
| 6,936,710 | B2 | * | 8/2005 | Bragd | C07C 45/29 536/102 |
| 8,816,066 | B2 | * | 8/2014 | Buchanan | C08B 3/08 536/32 |
| 9,085,666 | B2 | | 7/2015 | Goto et al. | |
| 2002/0072600 | A1 | * | 6/2002 | Bragd | C07C 45/29 536/56 |
| 2005/0281731 | A1 | * | 12/2005 | Powell | B01F 3/0865 423/473 |
| 2006/0008409 | A1 | * | 1/2006 | Powell | C01B 11/062 423/473 |
| 2011/0184077 | A1 | | 7/2011 | Goto et al. | |
| 2012/0258901 | A1 | * | 10/2012 | Parrish | C11D 3/0052 510/283 |
| 2014/0023581 | A1 | | 1/2014 | Adam | |
| 2014/0174257 | A1 | | 6/2014 | Ohira et al. | |
| 2017/0096540 | A1 | * | 4/2017 | Goh | C08J 11/20 |
| 2017/0165876 | A1 | * | 6/2017 | Goh | B29B 17/02 |

FOREIGN PATENT DOCUMENTS

| | | | |
|---|---|---|---|
| CN | 105601986 | A | 5/2016 |
| JP | 2002-525391 | A | 8/2002 |
| JP | 2005-255835 | A | 9/2005 |
| JP | 2005-255899 | A | 9/2005 |
| JP | 2013-0066046 | A1 | 6/2013 |
| JP | 2013-107973 | A | 6/2013 |
| JP | 2013-249386 | A | 12/2013 |
| JP | 2015-48427 | A | 3/2015 |
| KR | 2002/0066046 | A | 8/2002 |
| KR | 10-2011-0070854 | A | 6/2011 |
| KR | 10-2011-0113428 | A | 10/2011 |
| KR | 10-2013-0122973 | A | 11/2013 |
| WO | WO 95/07303 | A1 | 3/1995 |

OTHER PUBLICATIONS

Lester, Edward, et al. "Microwave heating as a mean for carbon fibre recovery from polymer composites: a technical feasibility study." *Materials Research Bulletin*, 2004, vol. 39, Issue 10, pp. 1549-1556 (8 pages of English).
Abdul-Wahab, Sabah A., et al., "Brine Management: Substituting Chlorine with On-Site Produced Sodium Hypochlorite for Environmentally Improved Desalination Process", *Water Resour Manage*, 2009, vol. 23, pp. 2437-2454 (18 pages in English).
Li, Juan, et al. "A promising strategy for chemical recycling of carbon fiber/thermoset composites: self-accelerating decomposition in a mild oxidative system", *Green Chemistry*, 2012, vol. 14, Issue 12, pp. 3260-3263 (4 pages in English).
Extended European Search Report dated Sep. 27, 2016 in corresponding European Application No. 16175528.5 (7 pages in English).
Japanese Office Action dated Aug. 15, 2017 in corresponding Japanese Patent Application No. 2016-143355 (8 pages in Japanese).
European Office Action dated May 22, 2018 in corresponding European Patent Application No. 16175528.5 (3 pages in English).
Japanese Office Action dated May 31, 2018 in corresponding Japanese Patent Application 2016-143355 (1 page in English, 2 pages in Japanese).

\* cited by examiner 0 h → 6 h pH 1 or less          pH 9

Product example 1 (R₁ = H, Y = Cl)

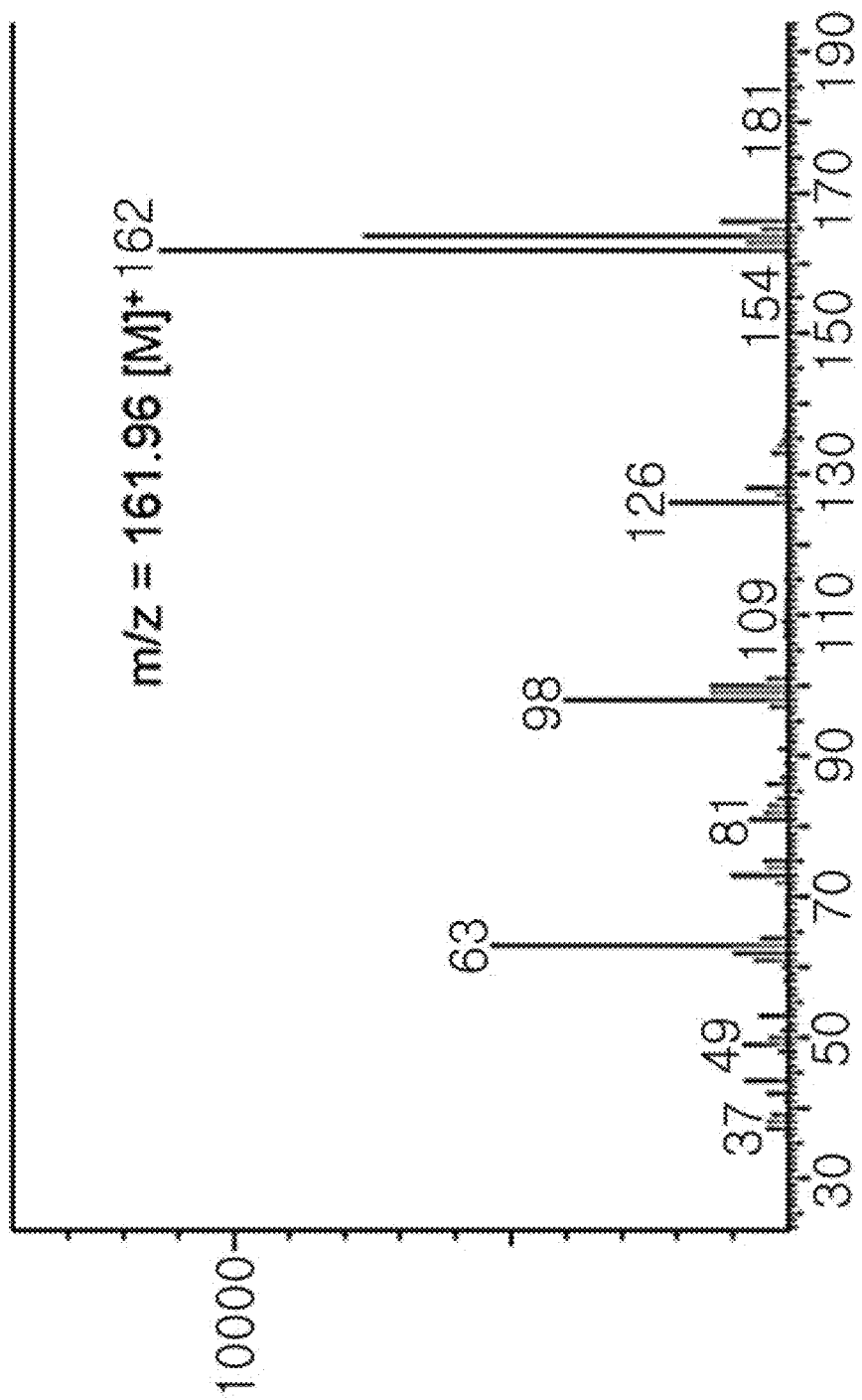

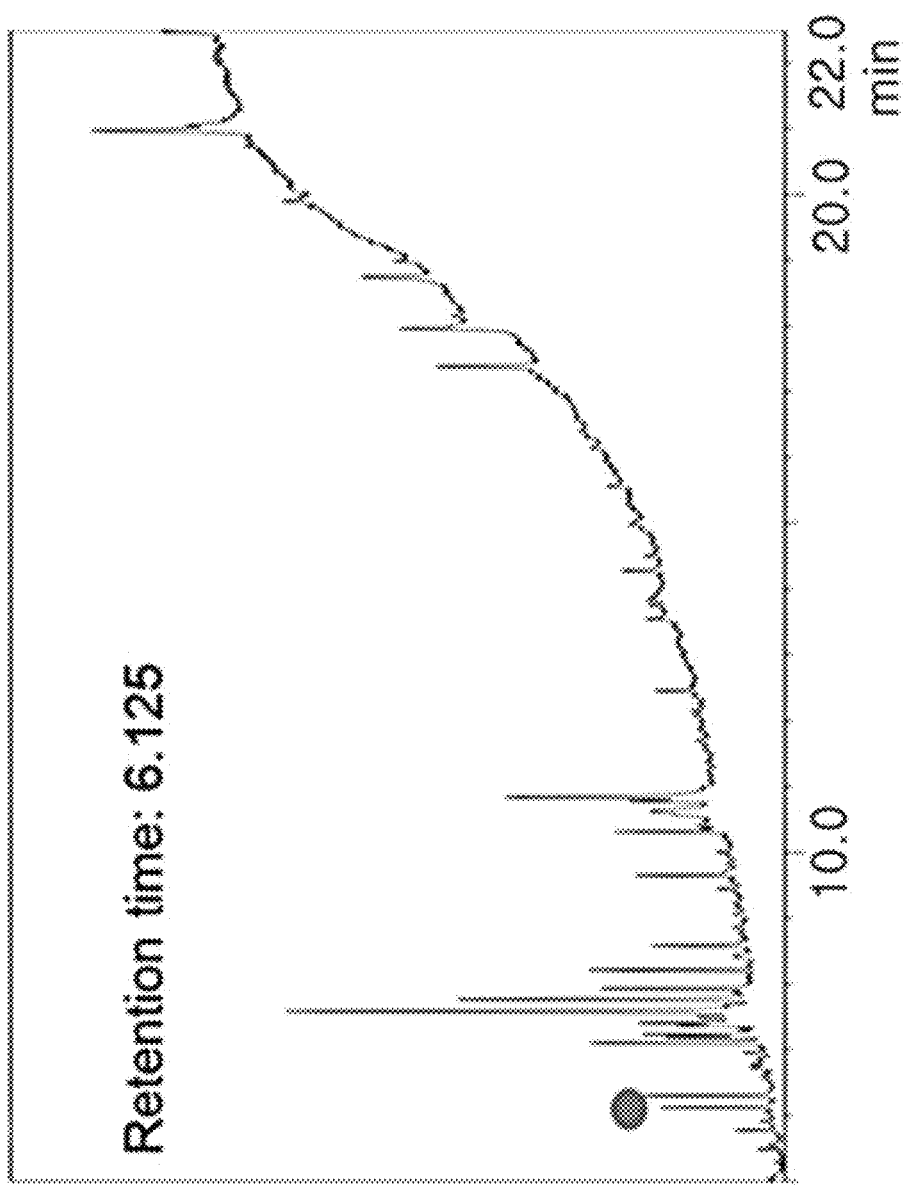

Product example2 (R₁ = H, Y = Cl)

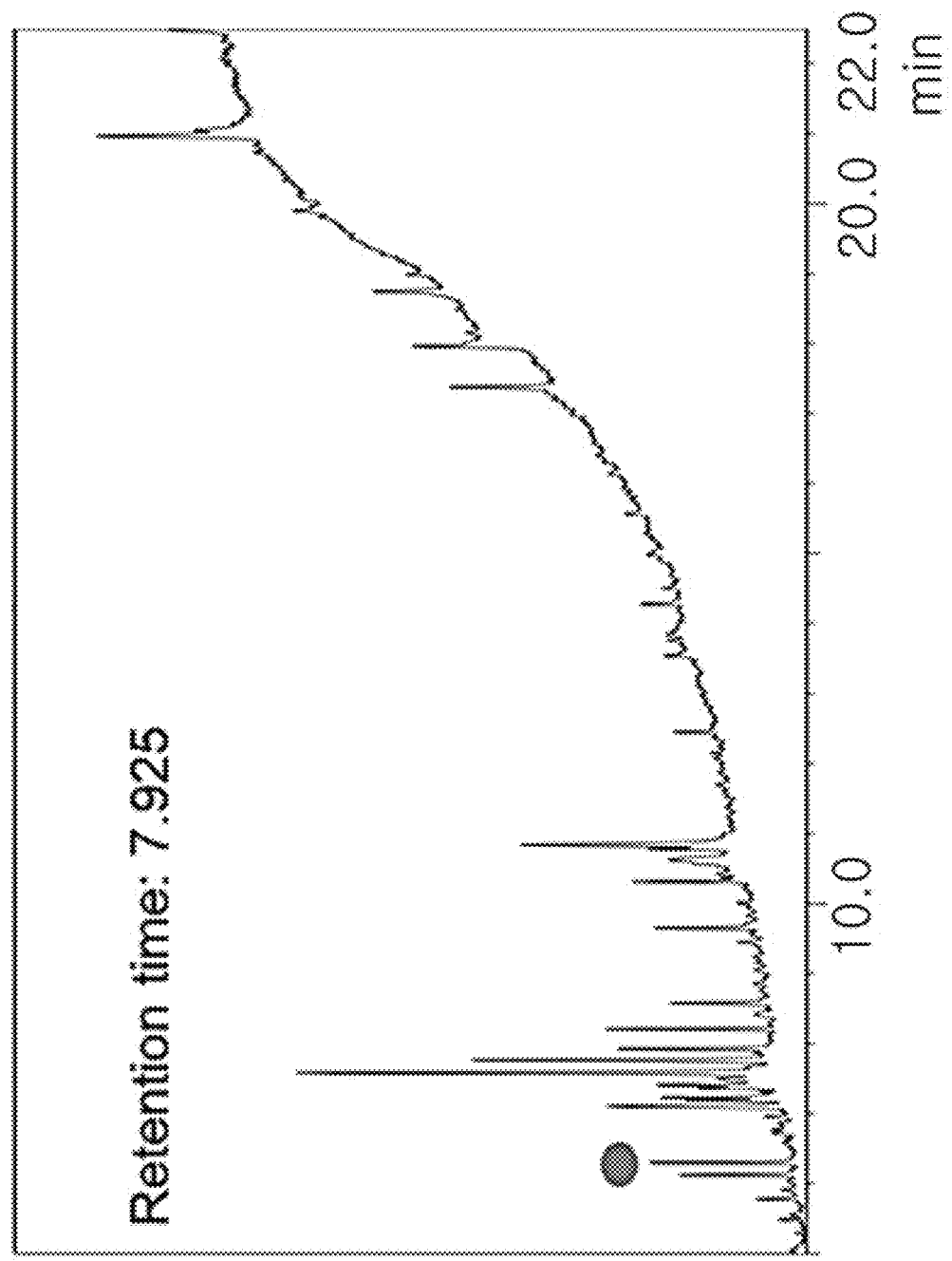

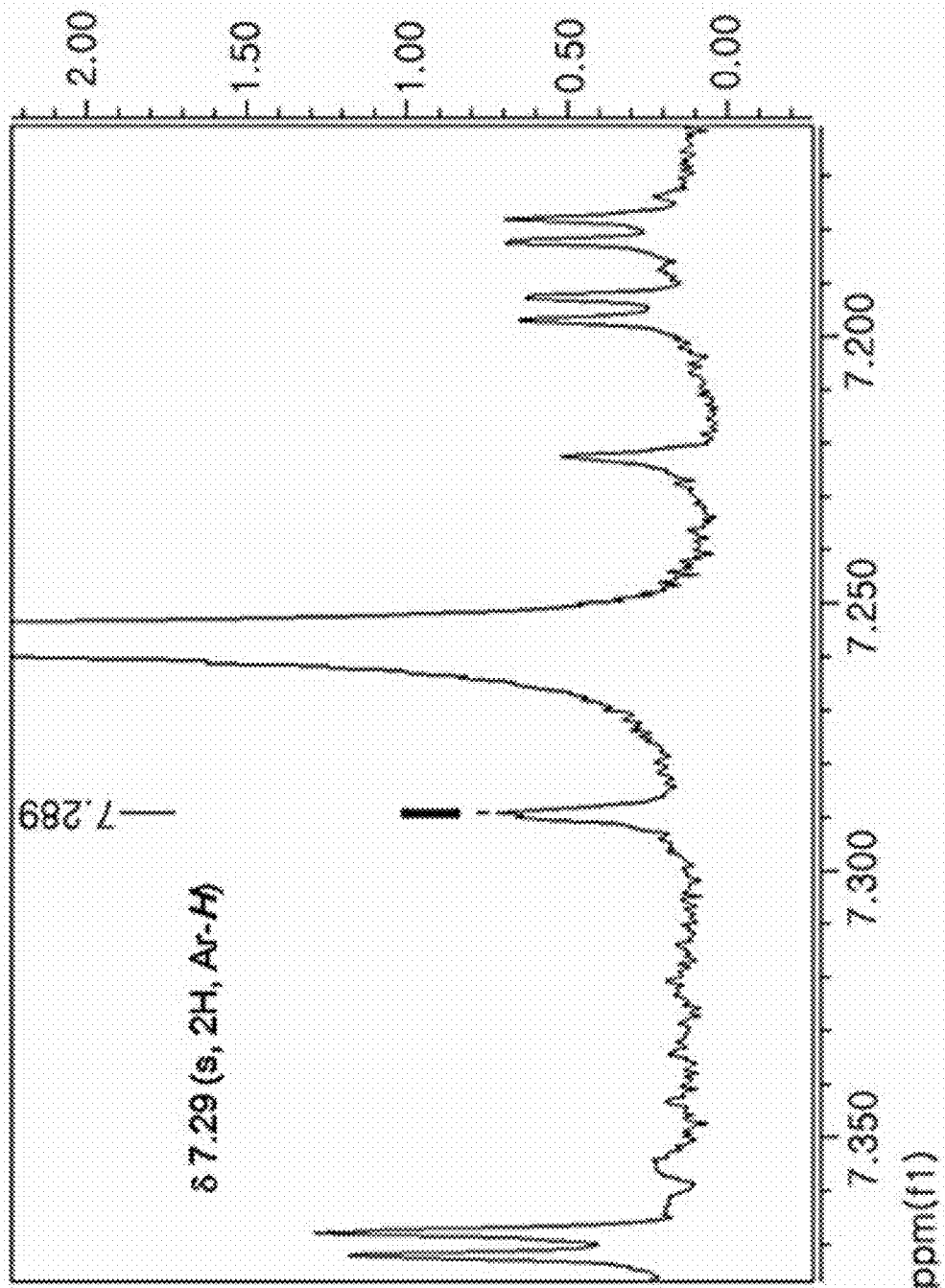

Product example 3 ($R_2$ = H, Y = Cl)

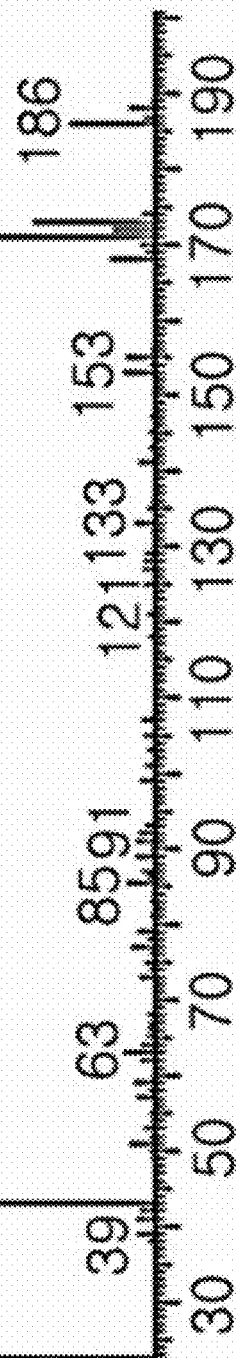

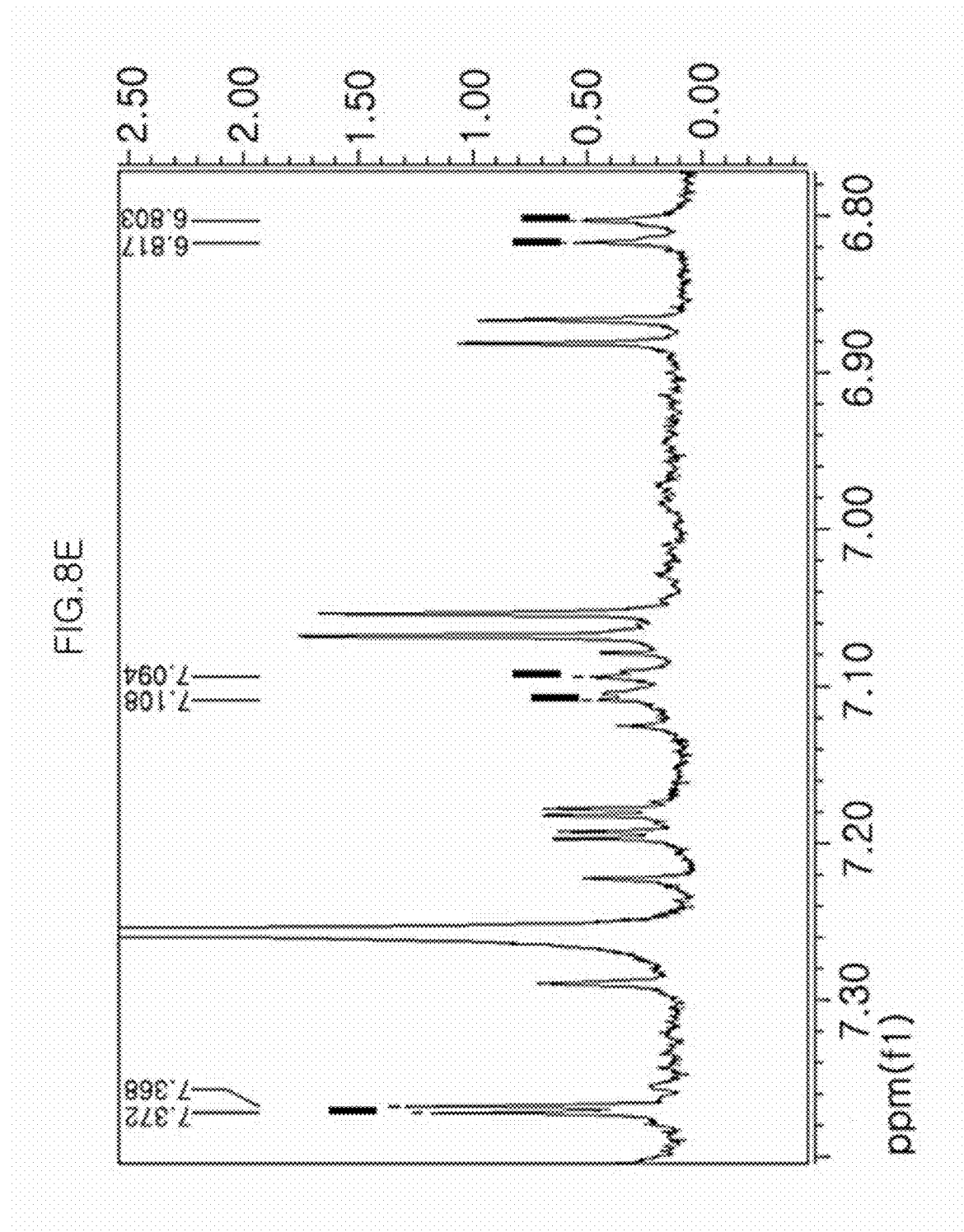

US 10,280,534 B2

METHOD AND COMPOSITION FOR DEPOLYMERIZATION OF CURED EPOXY RESIN MATERIALS

CROSS-REFERENCE TO RELATED APPLICATION

This application is a continuation of U.S. patent application Ser. No. 15/187,062 filed on Jun. 20, 2016, which claims the benefit under 35 USC 119(a) of Korean Patent Application No. 10-2015-0104002 filed on Jul. 22, 2015 and Korean Patent Application No. 10-2016-0030526 filed on Mar. 14, 2016, in the Korean Intellectual Property Office, the entire disclosures of which are incorporated herein by reference for all purposes.

BACKGROUND

1. Field

The present disclosure relates to a method and a composition for depolymerization of cured epoxy resin materials. Particularly, the present disclosure relates to a method for depolymerization of cured epoxy resin materials and a composition used therefor, a method for separating fillers from cured epoxy resin materials, fillers obtained by the method, etc.

2. Description of the Related Art

An epoxy resin is a thermosetting resin including a network polymer formed by ring-opening of epoxy groups generated when mixing an epoxy monomer having two or more epoxy groups in its molecule with a curing agent. Such an epoxy resin has excellent chemical resistance and durability, shows a low volumetric shrinkage upon curing, and thus may be used as a highly functional raw materials which are essential for various industrial fields, including adhesives, paints, electronic/electric industry, civil engineering/architectural industry, or the like.

In the field of composite materials that have been spotlighted recently, an epoxy resin is combined with various filler materials and used for various applications, including space aviation, info-communications and new energy fields. Thus, there has been an increasing demand for such epoxy resins. Particularly, carbon fiber reinforced plastics (CFRP) obtained by combination with carbon fibers are light and show excellent physical properties and durability, and thus are used widely as a key material in the field of cars or space aviation. In addition, epoxy resins combined with the other polymer resin materials have been used widely for producing high-performance materials.

An epoxy resin, once cured, forms a three-dimensional crosslinked network structure, which has strong resistance against chemicals. Thus, such an epoxy resin advantageously imparts materials with high durability and anticorrosive property, but undesirably has a difficulty in treating and reutilizing the materials after use.

Most cured epoxy resin materials have been treated by reclamation. This is significant waste in terms of cost and may cause severe environmental pollution.

Recently, a composite material of an epoxy resin with a filler has been increasingly in use, active studies have been conducted about methods for decomposing an epoxy resin selectively so that a filler material more expensive than an epoxy resin may be separated effectively.

Currently, the most generally used method for decomposing an epoxy resin and separating a filler material is a pyrolysis process. For example, in case of carbon fiber reinforced plastics (CFRP) using carbon fibers as fillers, Japanese companies, such as Toray, Teijin and Mitsubishi, have been taking the lead in treatment and recycle of CFRP based on pyrolysis in an amount of 1000 tons per year. However, separation of carbon fibers through a pyrolysis process requires a pretreatment process including preliminarily crushing CFRP mechanically. When CFRP is crushed to a size of several millimeters, carbon fibers may also be crushed and the carbon fibers to be recycled have a decreased length, which adversely affect the properties of carbon fibers. In addition, above all, such a pyrolysis process requires a high temperature of 500° C. or higher where organic compounds produce materials, such as dioxin, harmful to the human body due to combustion thereof.

Therefore, various chemical decomposition processes have been studied to decompose an epoxy resin efficiently at a lower temperature.

For example, when an epoxy resin is decomposed under supercritical or subcritical fluid, it is possible to treat a cured epoxy resin material at a temperature of 250-400° C. that is lower than the temperature of a pyrolysis process. When using such a process, there is an advantage in that the recovered filler material is less deteriorated as compared to a pyrolysis process.

However, according to the researches by the inventors of the present disclosure, the above method still requires a high temperature and high pressure of 10 atm or higher. Thus, the above method requires a special processing system capable of resisting such conditions, resulting in poor cost efficiency.

Meanwhile, some studies have been conducted to carry out decomposition of an epoxy resin under milder and more general processing conditions. However, in this case, it is not possible to dissolve various cured epoxy resin materials, including cured multi-functional epoxy resin materials or cured epoxy resin materials using an acid anhydride-based curing agent or aromatic diamine-based curing agent. In addition, a long reaction time and high reaction energy are still required. Moreover, it is problematic that various organic solvents harmful to the human body are used as main solvents for the reaction system.

Particularly, many numbers of conventional methods using an organic solvent as their main solvent for decomposition of an epoxy resin are known.

For example, there is disclosed a method for depolymerization of a waste printed circuit board by introducing an electrolyte containing an alkali metal and adding an organic solvent thereto (Korean Patent Application Publication No. 2011-0113428).

In addition, there is disclosed a method for treating an epoxy resin by crushing and acid-treating the epoxy resin and further treating the epoxy resin with an organic solvent and oxidant in a sealed reaction container (Chinese Patent No. 102391543).

There is also disclosed a method for decomposing an epoxy resin by using hydrogen peroxide and acetone (Green Chem., 2012, 14, 3260).

There is also disclosed a method for treating an epoxy resin composite material with a treatment solution containing a dewatered alkali metal compound and an organic solvent (Japanese Patent Application Publication No. 2005-255899).

It is also disclosed that an epoxy resin prepolymer is allowed to be in contact with an aprotic organic solvent having a dipolar moment of 3.0 or more so that the epoxy resin prepolymer may be dissolved in the solvent (Japanese Patent Application Publication No. 2013-107973).

Further, there is also disclosed use of an organic solvent including furan-2-carbaldehyde as extraction solvent or cracking solvent for separating carbon fibers from CFRP (US Patent Application Publication No. 2014-0023581).

The methods according to the related art disclose that decomposition of epoxy may be carried out by using an organic solvent under a mild condition at a relatively low temperature.

However, the methods according to the related art are using organic solvent reaction systems which adopt an organic solvent itself as their main key for dissolving an epoxy resin. Herein, since the organic solvent itself functions as contaminant source, such organic solvent reaction systems have a fundamental limit in that a problem of pollution caused by the organic solvent should be solved. In addition, such methods according to the related art have low applicability to sparingly decomposable epoxy resins or require a large amount of energy, resulting in unsatisfactory reaction efficiency.

SUMMARY

The present disclosure is directed to providing a method for depolymerization of a cured epoxy resin material, which may allow depolymerization of a cured epoxy resin material at a temperature of 200° C. or lower, specifically 100° C. or lower, in a very simple and rapid manner and reduce a processing cost and an energy requirement, a composition used for the method, and a depolymerized product obtained by the method.

The present disclosure is also directed to providing a method for depolymerization of a cured epoxy resin material, which may substitute for an organic solvent reaction system using an organic solvent as a main solvent and thus minimize environmental contamination or pollution caused by an organic solvent functioning as separate contamination source, a composition used for the method, and a depolymerization product obtained by the method.

In addition, the present disclosure is directed to providing a method for depolymerization of a cured epoxy resin material, which may provide increased efficiency of depolymerization of a cured epoxy resin material without using organic solvent reaction system which adopts an organic solvent as a main solvent, a composition used for the method, and a depolymerization product obtained by the method.

In addition, the present disclosure is directed to providing a method for depolymerization of a cured epoxy resin material, which may allow easy decomposition of a cured epoxy resin material having relatively high difficulty in decomposition, a composition used for the method, and a depolymerization product obtained by the method.

Further, the present disclosure is directed to providing a method for recovering a filler from a cured epoxy resin material which may prevent degradation of the properties of the filler after decomposing the cured epoxy resin material to provide a recycled filler having excellent properties, and a filler obtained by the method.

In one aspect, there is provided a composition for depolymerization of a cured epoxy resin material, comprising a compound represented by the chemical formula of $XO_mY_n$ (wherein X is hydrogen, alkali metal or alkaline earth metal, Y is halogen, m is a number satisfying $1 \leq m \leq 8$ and n is a number satisfying $1 \leq n \leq 6$), and a reaction solvent, wherein X is capable of being dissociated from $XO_mY_n$ and Y radical is capable of being produced from $XO_mY_n$ in the reaction solvent.

According to example embodiments, the reaction solvent may have a dielectric constant of at least about 65 or at least about 70 or at least about 75 or at least about 80.

According to example embodiments, the reaction solvent may be a $H_2O$-based reaction solvent that comprises $H_2O$ and has a dielectric constant of at least about 65 or at least about 70 or at least about 75 or at least about 80.

According to example embodiments, $H_2O$ may be in a liquid, gaseous or supercritical state.

According to example embodiments, the reaction solvent may be water alone.

According to example embodiments, the composition for depolymerization of a cured epoxy resin material may show a pH of 1-14 or 8-14, when X is an alkali metal or alkaline earth metal.

According to example embodiments, the compound may be at least one selected from the group consisting of HOF, HOCl, HOBr, HOI, NaOF, NaOCl, NaOBr, NaOI, LiOF, LiOCl, LiOBr, LiOI, KOF, KOCl, KOBr, KOI, $HO_2F$, $HO_2Cl$, $HO_2Br$, $HO_2I$, $NaO_2F$, $NaO_2Cl$, $NaO_2Br$, $NaO_2I$, $LiO_2F$, $LiO_2Cl$, $LiO_2Br$, $LiO_2I$, $KO_2F$, $KO_2Cl$, $KO_2Br$, $KO_2I$, $Ca(OF)_2$, $Ca(OCl)_2$, $Ca(OBr)_2$, $Ca(OI)_2$, $HO_3F$, $HO_3Cl$, $HO_3Br$, $HO_3I$, $NaO_3F$, $NaO_3Cl$, $NaO_3Br$, $NaO_3I$, $LiO_3F$, $LiO_3Cl$, $LiO_3Br$, $LiO_3I$, $KO_3F$, $KO_3Cl$, $KO_3Br$, $KO_3I$, $HO_4F$, $HO_4Cl$, $HO_4Br$, $HO_4I$, $NaO_4F$, $NaO_4Cl$, $NaO_4Br$, $NaO_4I$, $LiO_4F$, $LiO_4Cl$, $LiO_4Br$, $LiO_4I$, $KO_4F$, $KO_4Cl$, $KO_4Br$, $KO_4I$, $NaOCl_6$, $MgO_6F_2$, $MgO_6Cl_2$, $MgO_6Br_2$, $MgO_6I_2$, $CaO_6F_2$, $CaO_6Cl_2$, $CaO_6Br_2$, $CaO_6I_2$, $SrO_6F_2$, $SrO_6Cl_2$, $SrO_6Br_2$, $SrO_6I_2$, $BaO_6F_2$, $BaO_6Cl_2$, $BaO_6Br_2$, $BaO_6I_2$, $NaOCl_3$, $NaOCl_4$, $MgO_8Cl_2$, $CaO_8Cl_2$, $SrO_8Cl_2$, and $BaO_8Cl_2$.

According to example embodiments, the compound may be used in an amount of 0.001-99 wt % based on the weight of the composition for depolymerization.

According to example embodiments, the composition for depolymerization of a cured epoxy resin material may further comprise a radical-providing additive capable of accelerating radical production of $XO_mY_n$.

According to example embodiments, the radical-providing additive may be at least one selected from the group consisting of radical-containing compounds or compounds producing radicals in a reaction system.

According to example embodiments, the radical-providing additive may be used in an amount of 0.00001-99 wt % based on 100 wt % of the total weight of the composition.

In another aspect, there is provided a method for depolymerization of a cured epoxy resin material, comprising depolymerizing the cured epoxy resin material by using the said composition for depolymerization.

According to example embodiments, the reaction solvent may have a dielectric constant of at least about 65 or at least about 70 or at least about 75 or at least about 80.

According to example embodiments, the reaction solvent may be a $H_2O$-based reaction solvent that comprises $H_2O$ and has a dielectric constant of at least 65 or at least 70 or at least 75 or at least 80.

According to example embodiments, the composition for depolymerization may be an aqueous solution containing the compound.

According to example embodiments, the depolymerization may be carried out at a temperature of 20-200° C. or 20-100° C.

According to example embodiments, the cured epoxy resin material may be used in an amount of 1-90 parts by weight based on 100 parts by weight of the composition for depolymerization.

According to example embodiments, the method for depolymerization of a cured epoxy resin material may further comprise repeating depolymerization by adding a new cured epoxy resin material to a reaction solvent remaining after depolymerizing the cured epoxy resin material.

According to example embodiments, the method for depolymerization of a cured epoxy resin material may further comprise pretreating the cured epoxy resin material before subjecting the cured epoxy resin material to depolymerization in such a manner that the cured epoxy resin material may have an increased reaction surface area.

According to example embodiments, the pretreatment may be physical pretreatment, chemical pretreatment or a combination thereof.

According to example embodiments, the physical pretreatment may be at least one selected from the group consisting of dry crushing and wet crushing.

According to example embodiments, the chemical pretreatment may be carried out by dipping the cured epoxy resin material into an acidic composition.

According to example embodiments, the method for depolymerization of a cured epoxy resin material may further comprise preparing the compound represented by the formula of $XO_mY_n$.

According to example embodiments, the compound represented by the formula of $XO_mY_n$ may be HOY (wherein Y is halogen), and an aqueous solution containing HOY compound may be prepared by bubbling Y gas in water.

According to example embodiments, the compound represented by the formula of $XO_mY_n$ may be XOY (wherein X is an alkali metal and Y is halogen), and an aqueous solution containing XOY compound may be prepared by electrolyzing XY in water.

According to example embodiments, the method for depolymerization of a cured epoxy resin material may comprise forming a compound represented by the formula of $XO_mY_n$ in a reactor for depolymerization of a cured epoxy resin material, and carrying out depolymerization of the cured epoxy resin material.

According to example embodiments, the compound represented by the formula of $XO_mY_n$ may be sodium hypochlorite (NaOCl), and the method may comprise forming sodium hypochlorite (NaOCl) from a mixture of sodium hydroxide (NaOH) with chlorine ($Cl_2$) in a reactor for depolymerization of a cured epoxy resin material, and carrying out depolymerization of the cured epoxy resin material.

According to example embodiments, the composition for depolymerization may further comprise a radical-providing additive capable of accelerating radical production of $XO_mY_n$.

According to example embodiments, the radical-providing additive may be at least one selected from the group consisting of radical-containing compounds or compounds producing radicals in a reaction system.

In still another aspect, there is provided a depolymerized product of cured epoxy resin materials, which comprise C—Y (wherein Y is halogen) bonds having Y bound to carbon.

According to example embodiments, the depolymerized product of a cured epoxy resin material may further comprise at least one selected from the group consisting of fillers and polymer resins.

In still another aspect, there is provided a filler obtained by depolymerization of a cured epoxy resin material containing the filler, wherein the depolymerization of a cured epoxy resin material is carried out by using the said composition for depolymerization.

According to example embodiments, the filler may be at least one selected from the group consisting of carbon fibers, graphite, graphene, graphene oxide, reduced graphene, carbon nanotubes, glass fibers, inorganic salts, metal particles, ceramics, single molecular organic compounds, single molecular silicon compounds, and silicone resins.

In yet another aspect, there is provided a method for separating a filler from a cured epoxy resin material, comprising: depolymerizing a cured epoxy resin material by using the said composition for depolymerization of a cured epoxy resin material; and recovering a filler from the depolymerized cured epoxy resin material, and there is further provided the filler separated by the method.

According to example embodiments of the present disclosure, it is possible to carry out depolymerization of a cured epoxy resin material at a temperature of 200° C., specifically 100° C. or lower, and to reduce a processing cost and an energy requirement. It is also possible to substitute for a reaction system using an organic solvent as a main solvent, so that the contamination problems caused by the organic solvent functioning as separate contamination source may be solved and environmental contamination or pollution may be minimized. In addition, it is possible to increase depolymerization efficiency without using a reaction system based on an organic solvent as a main solvent. As well, it is possible to decompose a cured epoxy resin material having relatively high difficulty in decomposition with ease. Further, it is also possible to prevent degradation of properties of a filler recovered after decomposition of the cured epoxy resin material and thus to obtain recycled filler having excellent properties.

BRIEF DESCRIPTION OF THE DRAWINGS

The above and other aspects, features and advantages of the disclosed example embodiments will be more apparent from the following detailed description taken in conjunction with the accompanying drawings in which:

FIG. 6B shows a result of GC analysis of $H_2O$ reaction system after depolymerization for the depolymerized product example 1 in Example 1.

FIG. 6C shows GC-MS at a retention time of 6.125 in the GC analysis result.

FIG. 7C shows GC-MS at a retention time of 7.925 in the GC analysis result.

FIG. 7E shows a result of $H^1$-NMR of $H_2O$ reaction system after depolymerization for the depolymerized product example 2 in Example 1, wherein the result is directed to an analysis of H in the range of 9-6 ppm.

FIG. 8B shows a result of GC analysis of $H_2O$ reaction system after depolymerization for the depolymerized product example 3 in Example 1.

FIG. 8E shows a result of $H^1$-NMR of $H_2O$ reaction system after depolymerization for the depolymerized product example 3 in Example 1, wherein the result is directed to an analysis of H in the range of 9-6 ppm.

DETAILED DESCRIPTION

Figure 1A:
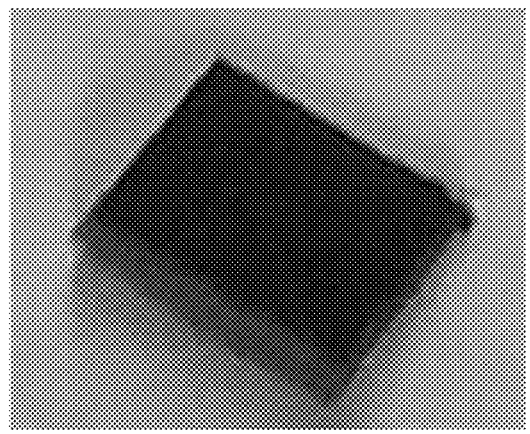
FIG. 1A is a photograph illustrating CFRP before carrying out depolymerization in Example 1.

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose example embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Definition of Terms

In the present disclosure 'cured epoxy resin material' means an epoxy resin or various composite materials including an epoxy resin. In addition, 'cured epoxy resin material' may also include not only a fully cured epoxy resin but also a partially cured epoxy resin or an intermediate (such as an epoxy resin prepolymer or prepreg) produced during the curing.

The composite materials may include various fillers and/or various polymer resins. For reference, an epoxy resin may be produced through a curing reaction between an epoxy compound having two or more epoxy groups in its molecule and a curing agent. There is no particular limitation in the epoxy compound and the curing agent. The epoxy compound may include a multifunctional epoxy compound, or the like. In addition, the curing agent may include one having an aromatic group or aliphatic group and may also include a curing agent having at least one selected from the group consisting of an amine group, acid anhydride group, imidazole group and mercaptan group in its molecule.

In the present disclosure, 'filler' means a filled material forming an epoxy composite material together with an epoxy resin.

In the present disclosure, 'polymer resin' means a polymer resin forming an epoxy resin composite material in addition to an epoxy resin.

In the present disclosure, there is no particular phase limitation in reaction solvent. Therefore, the reaction solvent may mostly be in liquid phase but a gaseous phase may also be included as for the reaction solvent phase. In addition, a supercritical phase may also be included as for the reaction solvent phase.

In the present disclosure, $H_2O$ may mostly be in liquid state but is not limited thereto. Further, a gaseous phase may also be included as for $H_2O$ phase. In addition, a supercritical phase may also be included as for $H_2O$ phase.

In the present disclosure, 'aqueous solution' is in a liquid phase as long as it is not specifically directed to be in a gaseous state or a supercritical state. In addition, the term 'aqueous solution' has water alone as for its solvent as long as it is not specifically stated that any other solvent is also mixed together.

In the present disclosure, 'organic solvent reaction system' means a reaction system using an organic solvent as a main solvent for the decomposition of a cured epoxy resin material.

In the present disclosure, '$H_2O$ reaction system' means a reaction system using $H_2O$ as a main solvent for the decomposition of a cured epoxy resin material. It is opposed to an organic solvent reaction system and refers to use of a $H_2O$-based reaction solvent during depolymerization. Although the $H_2O$-based reaction solvent may include a solvent besides $H_2O$ (i.e., it may be used in the form of mixed solvents), it is required that such mixed solvents have a dielectric constant of at least about 65, or preferably at least about 70 or at least about 75 or at least about 80. More preferable example is that the $H_2O$-based reaction solvent is composed of $H_2O$ alone (water has a dielectric constant of about 80.2).

In the present disclosure, 'depolymerization time' means a reaction time required for full depolymerization of a cured epoxy resin material provided for the depolymerization reaction. Herein, the full depolymerization means that residual cured epoxy resin material (solid) is not present substantially (i.e., residue ratio of epoxy resin is 5% or less). This may be determined, for example, by thermogravimetric analysis (TGA).

Further, for reference, the decomposition ratio of an epoxy resin in a cured epoxy resin material may also be calculated as follows. That is, decomposition ratio (%)= [(epoxy resin content in cured epoxy resin material–epoxy resin residue after decomposition)/(epoxy resin content in cured epoxy resin material)]×100. Then, the residue ratio of epoxy resin is 100%–decomposition ratio.

In the present disclosure, the expression 'cured epoxy resin material having relatively more difficulty in decomposition' means a cured epoxy resin material using a sparingly decomposable epoxy compound and/or curing agent. For example, a multicyclic novolak resin has relatively more difficulty in decomposition as compared to BPA. Further, for example, an aromatic curing agent or acid anhydride-based curing agent has relatively more difficulty in decomposition as compared to an aliphatic curing agent.

In the present disclosure, a dielectric constant may be determined by using a dielectric constant meter.

In the present disclosure, Y radical (wherein Y is halogen) means .Y having a non-shared single electron, such as .F, .Cl, .Br and .I.

In the present disclosure, the expression 'depolymerized product includes a C—Y (wherein Y is halogen) bond' means that Y is bound to carbon (such as carbon in a benzene ring) in a structural formula of a compound which is produced after depolymerization of a cured epoxy resin material. Herein, Y is derived from the compound represented by the chemical formula of $XO_mY_n$ (wherein X is hydrogen, alkali metal or alkaline earth metal, Y is halogen, m is a number satisfying $1 \leq m \leq 8$, and n is a number satisfying $1 \leq n \leq 6$).

In the present disclosure, 'pretreatment' means a treatment carried out for increasing a depolymerization reaction area before the depolymerization reaction of a cured epoxy resin material.

In the present disclosure, 'acidic composition' means a composition having acidic property capable of performing chemical pretreatment.

In the present disclosure, 'radical-providing additive' means a compound additionally added to a radical-producing reaction system of $XO_mY_n$ to provide further radicals in such a manner that the radical-producing reaction of $XO_mY_n$ may be accelerated.

In the present disclosure, 'radical-containing compound' means a stable compound while having radicals before it is added to a reaction system.

In the present disclosure, 'radical-producing compound' means a compound producing radicals when added in a reaction system.

DESCRIPTION OF EXAMPLE EMBODIMENTS

Hereinafter, example embodiments of the present disclosure will be described in detail.

In one aspect, there is provided a composition for depolymerization of a cured epoxy resin material, the composition including a compound represented by the chemical formula of $XO_mY_n$ (wherein X is hydrogen, alkali metal or alkaline earth metal, Y is halogen, m is a number satisfying $1 \leq m \leq 8$ and n is a number satisfying $1 \leq n \leq 6$), and a reaction solvent, wherein X is capable of being dissociated from $XO_mY_n$ and Y radical is capable of being produced from $XO_mY_n$ in the reaction solvent, as well as a method for depolymerization of a cured epoxy resin using the above said composition.

Surprisingly, it has been found by the present inventors that a cured epoxy resin material may be depolymerized easily and rapidly in the said composition including the above-specified compound in combination with the reaction solvent (particularly, $H_2O$-based solvent) without using an organic solvent-based reaction system. It is though that selection of a reaction solvent and a compound used in combination with the reaction solvent is important in order to carry out depolymerization of a cured epoxy resin material and to increase reaction efficiency under a low-temperature mild condition. In addition, as described hereinafter further in detail, it is thought to be important to control a dielectric constant of the reaction solvent to be a specified value or more to allow for the compound to depolymerize a cured epoxy material and to increase depolymerization efficiency.

Although the present disclosure is not bounded by theory, it is though that, in the depolymerization according to example embodiments of the present disclosure, X is dissociated first from the reaction solvent (particularly $H_2O$-based reaction solvent) and then Y radicals are produced finally (the radicals have a non-shared single electron, i.e., .Y). Then, the Y radicals (.Y) are bound to C of the cured epoxy resin material to form C—Y while depolymerizing the cured epoxy resin material. In addition, it is required to control a dielectric constant of the reaction solvent to have a specific value or more in order to carry out such dissociation of X, production of Y radicals and depolymerization of the cured epoxy resin material using the Y radicals at low energy.

Therefore, according to example embodiments, the reaction solvent is selected in such a manner that X may be dissociated from ionically bonded $XO_mY_n$ and then Y radicals may be produced effectively after the dissociation of X. In addition, in order to increase reaction efficiency, it is required for the reaction solvent to have a dielectric constant of at least about 65 or at least about 70 or at least about 75 or at least about 80.

According to example embodiments, the reaction solvent may be a $H_2O$-based reaction solvent. When depolymerizing a cured epoxy resin material by using a compound represented by the chemical formula of $XO_mY_n$, the dielectric constant of the $H_2O$-based solvent used in combination with the compound affects the depolymerization efficiency of the cured epoxy resin material. It is thought that this is because $H_2O$-based reaction solvent does not decompose the cured epoxy resin material directly but participates in dissociation of X and production of Y radicals from the compound of $XO_mY_n$ which depolymerizes the cured epoxy material, unlike an organic solvent in an organic solvent reaction system. It is required that the $H_2O$-based reaction solvent has a dielectric constant of at least about 65 or at least about 70 or at least about 75 or at least about 80. At a dielectric constant of at least 65, reaction efficiency begins to increase rapidly. Particularly, the $H_2O$-based reaction solvent is composed of $H_2O$ alone (dielectric constant of water is about 80.2). When $H_2O$ is used alone as for the $H_2O$-based reaction solvent, the decomposition efficiency of a cured epoxy resin material increases significantly (see Experiment 2 described hereinafter).

On the contrary, in the organic solvent-based reaction system according to the related art, an organic solvent is used as a main solvent so as that the organic solvent dissolves a cured epoxy resin material directly. Even though $XO_mY_n$ is introduced to an organic solvent, it is not possible to dissociate X and to produce Y radicals from $XO_mY_n$ in the organic solvent and thus they cannot be provided for depolymerization of a cured epoxy resin material. For example, in the case of NMP, NMP has a dielectric constant of 32 and $XO_mY_n$ is not dissolved in NMP.

In this regard, the present inventors have observed the decomposition efficiency of a cured epoxy resin material as a function of dielectric constant. The observation reveals that $XO_mY_n$ having an ionic bond shows different dissociation behavior and reactivity in water and an organic solvent, resulting in different decomposition efficiency of a curd epoxy resin material.

The reason why such different decomposition efficiency is observed may be that there are differences in solubility and radical production of the compound of $XO_mY_n$ in water and in an organic solvent.

First, with respect to the difference in solubility, a difference in polarity (i.e. dielectric constant) between water and an organic solvent may cause a difference in solubility of the ionically bonded $XO_mY_n$. This is because the dipole-ion binding force of a solvent should be larger than the ion-ion lattice energy of an ionically bonded material in order to dissociate ions in the solvent.

Meanwhile, with respect to the radical production, the first reaction of producing radicals from $XO_mY_n$ in water may be represented by the following Reaction Scheme 1. Thus, it is required to allow such reaction for production of radicals from $XO_mY_n$ in water. Further, same equivalent of water with that of $XO_mY_n$ may be needed to be present in order to make the reaction for production of radicals occur sufficiently, which results in an effective production of radicals from $XO_mY_n$.

$$XO_mY_n + H_2O \rightarrow X^+ + HO^- + HO_mY_n$$

$$HO_mY_n \rightarrow HO\cdot + {}^{(m-1)}/2 O_2 + nY. \qquad \text{[Reaction Scheme 1]}$$

In view of the above description, it is required to use a solvent having a high dielectric constant, preferably a $H_2O$-based solvent, for depolymerization in order to allow effective dissociation of $XO_mY_n$ and to provide Y radicals effectively. As well, when using an organic solvent, problems including contamination caused by the organic solvent and recycle of the organic solvent occur. Thus, in the environmental aspects, it is preferable to use $H_2O$-based solvent, and particularly it is most preferable to use $H_2O$ solvent alone (i.e., 100 wt % or 100 vol % of $H_2O$ in the reaction solvent).

Further, it is thought that since Y (halogen) radicals have a low hemolytic dissociation energy required for producing radicals, production of radicals is facilitated. For example, Y (halogen) radicals have lower hemolytic dissociation energy as compared to OH radicals in the acetone-based system and hydrogen peroxide-based system as disclosed, for example, in Korean Patent Application Publication No. 2011-0113428. This suggests that when using Y (halogen) radicals, it is possible to form radicals at lower energy effectively as compared to the materials, such as hydrogen peroxide, and thus to carry out depolymerization of a cured epoxy resin material at a lower energy. Therefore, it is possible to depolymerize a cured epoxy resin material at a lower temperature and to carry out effective depolymerization of a cured epoxy resin material, which was sparingly soluble in the related art.

As mentioned above, Y radicals produced from the dissociation of $XO_mY_n$ causes substitution of the depolymerized product with Y radicals. That is, the depolymerized product becomes to have C—Y bonds.

The above reaction mechanism may be explained, for example, as in the following Reaction Scheme 2.

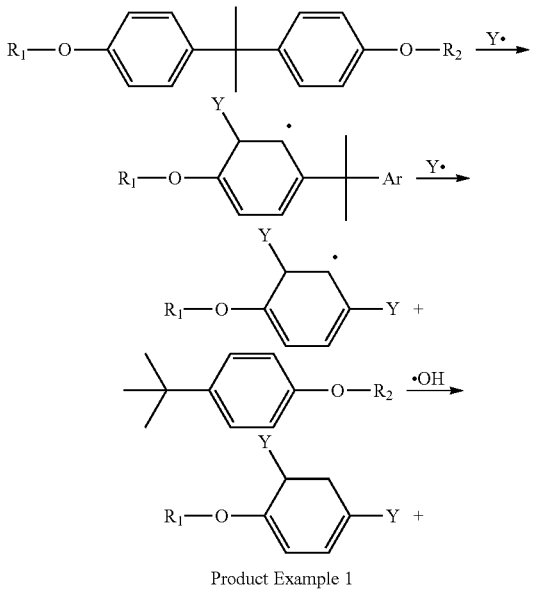

Product Example 1

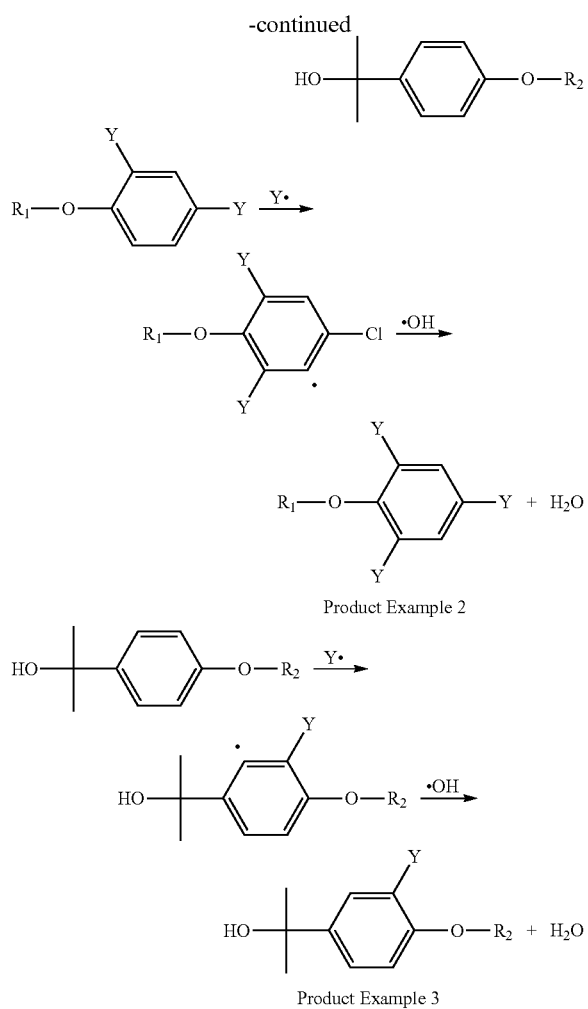

Product Example 2

Product Example 3

$R_1R_2$ = H or Repeating unit

As shown in Reaction Scheme 2, the depolymerized product may include at least one of product example 1, product example 2 and product example 3, etc. That is, the depolymerized product has C—Y bonds where a part of carbon atoms (e.g. a part of carbon atoms in a benzene ring) is bound to Y.

Therefore, in another aspect, there is provided a depolymerized product of a cured epoxy resin material which includes C—Y bonds (wherein Y is halogen) where Y from $XO_mY_n$ is bound to C of the depolymerized product. For reference, the following Experiment 1 shows the analysis results of three types of depolymerized product examples having such C—Y bonds formed. The results suggest that the depolymerized product according to the example embodiments of the present disclosure has C—Y bonds.

When carrying out depolymerization of a cured epoxy resin material by using the composition for depolymerization of a cured epoxy resin material as described above, it is possible to decompose a waste cured epoxy resin material simply and rapidly under a mild condition, for example, at a temperature of 200° C. or lower, particularly 100° C. or lower using smaller energy. This is a significant decrease in decomposition reaction temperature as compared to that of the conventional pyrolysis process (about 200-400° C.).

In addition, it can be seen that the reaction efficiency is significantly high as compared to the cases using a different combination of a reaction solvent with a compound, for example, in which an organic solvent is used and thus a low dielectric constant is applied [e.g. Comparative Example 1 (not dissolved) using a combination of hydrogen peroxide mixed with acetone, or Comparative Example 2 (not dissolved) using a combination of sodium hypochlorite mixed with acetone], or as compared to Comparative Example 3 using aqueous nitric acid solution (reaction time: 12 hours). Moreover, unlike the organic solvent-based reaction systems according to the related art, the method disclosed herein uses a $H_2O$-based reaction system and thus may avoid a need for an organic solvent harmful to the human body, resulting in an advantage in environmental aspects.

Meanwhile, it is possible to separate and recycle a filler material contained in a cured epoxy resin material with ease through the above-described treatment. The obtained filler is prevented from degradation of properties even though it has been subjected to a decomposition process, and thus may be very advantageous in recycling.

According to example embodiments, in the compound of $XO_mY_n$, X may be hydrogen, or alkali metal, such as lithium, potassium or sodium, or alkaline earth metal, such as calcium or magnesium. According to example embodiments, Y in the compound of $XO_mY_n$ may be a halogen selected from F, Cl, Br, I etc.

In non-limiting examples, m and n may represent a natural number within the above-defined ranges, respectively. However, they are not limited to the natural number, and, for example, when forming a complex, m and n may be a decimal number.

In non-limiting examples, the compound of $XO_mY_n$ wherein m is 1 and n is 1 may include HOF, HOCl, HOBr, HOl, NaOF, NaOCl, NaOBr, NaOl, LiOF, LiOCl, LiOBr, LiOl, KOF, KOCl, KOBr, KOl or the like.

In non-limiting examples, the compound of $XO_mY_n$ wherein m is 2 and n is 1 may include $HO_2F$, $HO_2Cl$, $HO_2Br$, $HO_2l$, $NaO_2F$, $NaO_2Cl$, $NaO_2Br$, $NaO_2l$, $LiO_2F$, $LiO_2Cl$, $LiO_2Br$, $LiO_2l$, $KO_2F$, $KO_2Cl$, $KO_2Br$, $KO_2l$, or the like.

In non-limiting examples, the compound of $XO_mY_n$ wherein each of m and n is 2 may include $Ca(OF)_2$, $Ca(OCl)_2$, $Ca(OBr)_2$, $Ca(Ol)_2$, or the like.

In non-limiting examples, the compound of $XO_mY_n$ wherein m is 3 and n is 1 may include $HO_3F$, $HO_3Cl$, $HO_3Br$, $HO_3l$, $NaO_3F$, $NaO_3Cl$, $NaO_3Br$, $NaO_3l$, $LiO_3F$, $LiO_3Cl$, $LiO_3Br$, $LiO_3l$, $KO_3F$, $KO_3Cl$, $KO_3Br$, $KO_3l$, or the like.

In non-limiting examples, the compound of $XO_mY_n$ wherein m is 4 and n is 1 may include $HO_3F$, $HO_4Cl$, $HO_4Br$, $HO_4l$, $NaO_4F$, $NaO_4Cl$, $NaO_4Br$, $NaO_4l$, $LiO_4F$, $LiO_4Cl$, $LiO_4Br$, $LiO_4l$, $KO_4F$, $KO_4Cl$, $KO_4Br$, $KO_4l$, or the like.

In non-limiting examples, the compound of $XO_mY_n$ wherein m is 6 and n is 2 may include $MgO_6F_2$, $MgO_6Cl_2$, $MgO_6Br_2$, $MgO_6I_2$, $CaO_6F_2$, $CaO_6Cl_2$, $CaO_6Br_2$, $CaO_6I_2$, $SrO_6F_2$, $SrO_6Cl_2$, $SrO_6Br_2$, $SrO_6I_2$, $BaO_6F_2$, $BaO_6Cl_2$, $BaO_6Br_2$, $BaO_6I_2$, or the like.

In non-limiting examples, the compound of $XO_mY_n$ wherein m is 1 and n is 3 may include $NaOCl_3$, or the like, and the compound of $XO_mY_n$ wherein m is 1 and n is 4 may include $NaOCl_4$, or the like.

The maximum value of m to form $XO_mY_n$ is 8 and particular non-limiting examples of such compound may include $MgO_8Cl_2$, $CaO_8Cl_2$, $SrO_8Cl_2$, $BaO_8Cl_2$, or the like. When the maximum value of n to form $XO_mY_n$ is 6, particular non-limiting examples of such compound may include $NaOCl_6$.

According to example embodiments, it is particularly preferable that the $H_2O$-based solvent is an aqueous solution (that is, reaction solvent is H₂O alone, or in the case of liquid phase water alone) as described above.

According to example embodiments, when X is alkali metal or alkaline earth metal in $XO_mY_n$, a pH condition of the composition (or the aqueous solution) for depolymerization is controlled to be weak acidic, neutral or alkaline condition of pH 1 or more. It is thought that when controlling pH in this manner, X (alkali metal or alkaline earth metal) may be decomposed into XOH or $X(OH)_2$ etc. more easily in the H₂O-based reaction system.

In non-limiting examples, the composition (or the aqueous solution) for depolymerization may have a pH of 1-14, and in view of reactivity may have in particular a pH of 8-14.

According to example embodiments, the depolymerization may be carried out at a temperature less than 250° C. (e.g. 20° C. or more and less than 250° C.), or 200° C. or less (e.g. 20-200° C.), or 100° C. or less (e.g. 20-100° C. or 20-70° C.).

According to example embodiments, the H₂O-based reaction solvent may be a liquid phase, gaseous phase or supercritical phase. Use of a liquid phase is advantageous in that the process is simple and energy requirement is low. Although depolymerization may be carried out rapidly at low temperature while using a liquid phase according to example embodiments of the present disclosure, it should be understood that a gaseous phase or a supercritical phase may also be used intentionally instead of the liquid phase. The use of such a supercritical phase may furthermore reduce reaction time but may have demerits such as a complicated reaction system and process.

According to example embodiments, it is advantageous to further include a radical-providing additive together with $XO_mY_n$ since the additive may accelerate depolymerization of a cured epoxy resin material. As defined above, the radical-providing additive means a compound additionally added to a radical-producing reaction system of $XO_mY_n$ to provide further radicals so that radical production of $XO_mY_n$ may be accelerated.

Such a radical-providing additive may be a compound in a stable form having radicals in itself already before it is added to a reaction system (referred to as a radical-containing compound), or a compound producing radicals when added in a reaction system. The compound producing radicals in a reaction system (referred to as a radical-producing compound) may be a compound producing radicals through chemical reaction or physical action in a reaction system.

In non-limiting examples, such a radical-providing additive may include benzoyl peroxide (BPO), sodium percarbonate, Fremy's salt (disodium nitrosodisulfonate), TEMPO [(2,2,6,6-tetramethyl-piperidin-1-yl)oxyl], or the like.

Among those, Fremy's salt or TEMPO, etc. is a radical-containing compound having radicals in itself, and BPO or sodium percarbonate, etc. is a compound producing radicals in a reaction system.

Particularly, for example, the radical production mechanism of sodium percarbonate in a reaction system may be explained, for example, as in the following Reaction Scheme 3:

[Reaction Scheme 3]

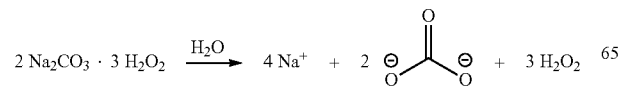

-continued

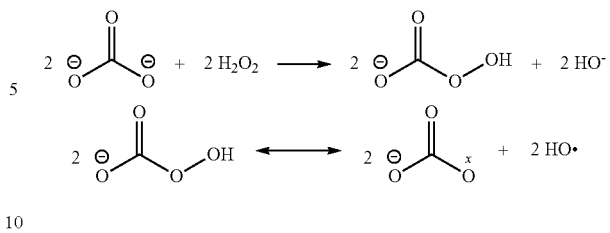

As shown in Reaction Scheme 3, sodium percarbonate may produce a hyperacid type reaction species due to water in the reaction system and the hyperacid species may exist as carbonate radical and hydroxyl radical in the reaction system.

The produced radicals may accelerate radical production from $XO_mY_n$. That is, for example, as shown in the following Reaction Scheme 4, when compared to a reaction in which $HO_mY_n$ is converted simply into the three radicals (with respect to $HO_mY_n$, see Reaction Scheme 1), the presence of radicals before the reaction may allow production of a stable compound after reaction, and thus the reaction equilibrium may move toward the right side more.

[Reaction Scheme 4]

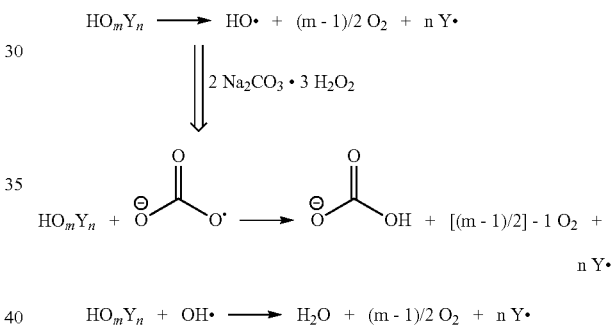

Meanwhile, in the case of BPO (a compound producing radical), two phenyl radicals are produced by heating (see Reaction Scheme 5). In the case of Fremy's salt and TEMPO (radical-containing compound), the compound itself exists in the form of a radical (see Chemical Formula 1 and Chemical Formula 2). As like in the case of sodium percarbonate, the above-mentioned compounds may be additionally added to the radical production system of $XO_mY_n$ and provide further radicals to accelerate radical production from $XO_mY_n$.

[Reaction Scheme 5]

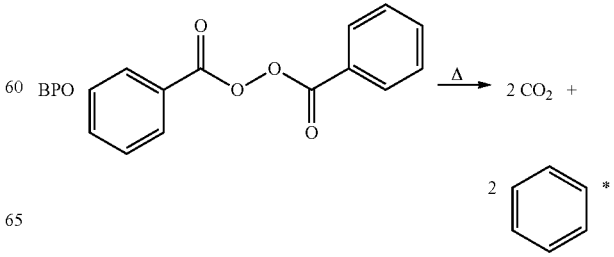

-continued

[Chemical Formula 1]

Frémy's salt [K⁺]₂

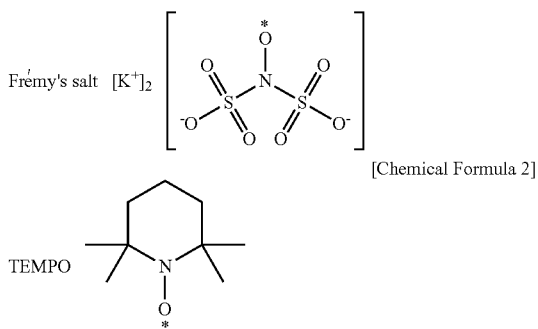

[Chemical Formula 2]

TEMPO

In this manner, it is possible to accelerate depolymerization of a cured epoxy resin material by accelerating radical production from $XO_mY_n$. A reaction rate formula of decomposition of C—C bonds using radicals is exponentially in proportion to a radical concentration in a reaction system as shown in a following Reaction Scheme 6. This reaction rate formula may be applied to the embodiments of the present disclosure. Therefore, it is possible to increase the radical concentration in the reaction system by virtue of the above-mentioned radical-providing additives and to increase the reaction rate, so that depolymerization of a cured epoxy resin material may be accelerated.

$$R_1\text{-}R_2 + 2R_3\cdot \rightarrow R_1\text{-}R_3 + R_2\text{-}R_3$$

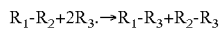

[$R_1\text{-}R_3$] = [$R_2\text{-}R_3$] = $k[R_3\cdot]^\alpha t$  [Reaction Formula 6]

Wherein $R_1$-$R_2$: cured epoxy resin material $R_3$: radicals (.OH, .H, .R, .Cl, . . . )

$R_1$-$R_3$, $R_2$-$R_3$: depolymerized products k: rate constant

α≈2 t: depolymerization time According to example embodiments, the radical-providing additive may be used in an amount of 0.00001-99 wt %, particularly 0.1-10 wt % based on 100 wt % of the total composition (reaction solvent+ $XO_mY_n$ compound).

According to example embodiments, a process for pretreating a cured epoxy resin material may be further carried out in such a manner that the cured epoxy resin material may have an increased reaction surface area before it is subjected to depolymerization. As described above, according to example embodiments of the present disclosure, it is possible to reduce reaction time significantly at low temperature with no need for a separate pretreatment process. However, it is possible to reduce reaction time further through the pretreatment for increasing the reaction surface area. In other words, it is possible to facilitate a subsequent depolymerization by increasing the reaction area of the cured epoxy resin material through such pretreatment.

According to example embodiments, the pretreatment may include a physical pretreatment, a chemical pretreatment or a combination thereof.

In non-limiting examples, the physical pretreatment may be a crushing. The crushing may be at least one selected from dry crushing and wet crushing and may be carried out by using at least one selected from the group consisting of a hammer mill, cutter mill, flake crusher, feather mill, pin type crusher, impact crusher, microcrusher, jet mill, micron mill, ball mill, meteor mill, hydro mill and an auqarizer. The cured epoxy resin material crushed according to an example embodiment may have a size of 1 μm-10 cm.

In non-limiting examples, the chemical pretreatment may be carried out by dipping a cured epoxy resin material into an acidic composition (i.e. acid treatment).

In non-limiting examples, the acidic composition used for the dipping may have a pH of 5.0 or less and a temperature of 20-250° C. The cured epoxy resin material may be separated from the acidic composition 0.1-24 hours after it is dipped in the acidic composition. Then, the separated cured epoxy resin material may be washed.

In non-limiting examples, the acidic composition may be a gaseous composition including at least one material selected from the group consisting of air, nitrogen, argon, helium and water vapor, as well as an acidic material.

In addition, the acidic composition may be a liquid composition including at least one selected from the group consisting of water, acetone, acetic acid, ethyl acetate, methyl ethyl ketone, N-methyl-2-pyrolidone, N,N-dimethyl formamide, N,N-dimethylacetamide, tetrahydrofuran, acetonitrile, t-butanol, n-butanol, n-propanol, i-propanol, ethanol, methanol, ethylene glycol, dimethyl sulfoxide and 1,4-dioxane, as well as an acidic material.

In addition, the gaseous or liquid composition may be used alone or in combination. However, use of an organic solvent among above said acidic composition is not preferable in environmental aspects.

According to example embodiments, the cured epoxy resin material to be decomposed may include various fillers and/or polymer resins.

According to example embodiments, the filler may be at least one selected from the group consisting of carbon fibers or other graphite, graphene, graphene oxide, reduced graphene, carbon nanotubes, glass fibers, inorganic salts, metal particles, ceramic materials, single molecular organic compounds, single molecular silicon compounds, silicone resins, etc.

According to example embodiments, the polymer resin may be at least one selected from the group consisting of an acrylic resin, olefin resin, phenol resin, natural rubber, synthetic rubber, aramid resin, polycarbonate, polyethylene terephthalate, polyurethane, polyamide, polyvinyl chloride, polyester, polystyrene, polyacetal, acrylonitrile butadiene styrene and styrene acrylonitrile.

According to example embodiments, the compound of $XO_mY_n$ may be used in an amount of 0.001-99 wt % based on 100 wt % of the total composition (reaction solvent+ $XO_mY_n$). In non-limiting examples, when the reaction solvent is aqueous solution, the compound of $XO_mY_n$ may be used in an amount of 0.001-99 wt % based on the total weight of the aqueous solution containing the compound of $XO_mY_n$.

According to example embodiments, the cured epoxy resin material may be used in an amount of 1-90 parts by weight based on 100 parts by weight of the composition for depolymerization (reaction solvent+$XO_mY_n$ compound). In non-limiting examples, when the reaction solvent is an aqueous solution, the cured epoxy resin material (e.g. CFRP) may be used in an amount of 1-90 parts by weight based on 100 parts by weight of the aqueous solution containing the compound of $XO_mY_n$.

According to example embodiments, the method may further include preparing the compound of $XO_mY_n$. The prepared $XO_mY_n$ may be provided to a cured epoxy resin material so that chemical depolymerization may be carried out.

In non-limiting examples, when the compound of $XO_mY_n$ is HOY, halogen gas (e.g. Cl, etc.) may be bubbled in water to prepare aqueous HOY solution, and then a cured epoxy resin material may be introduced thereto. In this manner, it is possible to provide the composition for depolymerization to the cured epoxy resin material.

In other words, in the non-limiting examples, when the compound is HOCl, $Cl_2$ gas may be bubbled to form aqueous HOCl solution and a cured epoxy resin material, such as CFRP, may be introduced thereto to carry out depolymerization.

In non-limiting examples, when the compound of $XO_mY_n$ is XOY (wherein X is alkali metal and Y is halogen), XY may be electrolyzed in water to form an aqueous solution containing the compound of XOY, and then a cured epoxy resin material may be introduced thereto so that the composition for depolymerization may be provided to the cured epoxy resin material.

That is, in the non-limiting examples, when the compound is NaOCl, NaCl may be electrolyzed in water to form an aqueous solution containing NaOCl, and then a cured epoxy resin material, such as CFRP, may be introduced thereto to carry out depolymerization.

Meanwhile, in non-limiting examples, the compound of $XO_mY_n$ may be prepared through a chemical or a physical reaction in a reactor (depolymerization reaction system) for depolymerization of a cured epoxy resin material.

For example, in the non-limiting examples, an aqueous sodium hypochlorite (NaOCl) solution may be produced by mixing an aqueous sodium hydroxide (NaOH) solution with chlorine ($Cl_2$) in a depolymerization reactor, and a cured epoxy resin material may be depolymerized by using the solution.

Meanwhile, In still another aspect, there is provided a method for separating a filler from a cured epoxy resin material, including: carrying out depolymerization of a cured epoxy resin material by using the said composition for depolymerization including the compound represented by $XO_mY_n$ and the reaction solvent; and recovering a filler from the depolymerized cured epoxy resin material, for example, through filtering or extraction, and there is further provided a filler obtained thereby.

The filler separated and recovered from the cured epoxy resin material may be prevented from degradation of properties as compared to that in the cured epoxy resin material before depolymerization. Thus, it is possible to obtain a recycled filler having excellent properties.

For example, as can be seen from the following examples, when the filler is a carbon fiber, it shows very low degradation of properties, such as tensile strength or elongation, of for example about 13% or less as compared to the carbon fiber raw material contained in the cured epoxy resin material. For reference, when carbon fibers are recovered from CFRP through a pyrolysis process, they show a drop in tensile strength of about 15% or more as compared to the carbon fiber raw materials (e.g. Mater. Res. Bull. 2004, 39, 1549). On the contrary, when carrying out depolymerization according to the embodiments of the present disclosure, it is possible to recover carbon fibers while minimizing degradation of tensile strength of the carbon fibers.

According to example embodiments, in the method, it is possible to repeat decomposition by adding a new cured epoxy resin material to a reaction solution remained after depolymerization.

The resultant product obtained by the above method for depolymerization of a cured epoxy resin material may be in a low-viscosity aqueous solution state and have no gel-like floating materials, and it is possible to separate a filler from the aqueous solution through filtering or extraction, etc.

Hereinafter, the present disclosure will be described in detail through examples. However, the following examples are for illustrative purposes only and it will be apparent to those of ordinary skill in the art that the scope of the present disclosure is not limited by the examples.

[Experiment 1]

Water is used alone as a reaction solvent in the following examples. Most examples use an aqueous solution (liquid phase) except that Example 3 uses a gaseous aqueous solution, and except that Example 4 uses a supercritical aqueous solution. Water has a dielectric constant of about 80.2.

Meanwhile, Comparative Examples 1 and 2 use a mixed solvent of water with acetone wherein the mixed solvent has a dielectric constant of about 44.

Meanwhile, Example 5 uses waste CFRP in an increased amount of 16 times of the amount of waste CFRP used in Example 1. Examples 6-9 use waste CFRP in an increased amount of 10 times of the amount of waste CFRP used in Example 1 in combination with an increased amount of aqueous sodium hypochlorite solution.

In addition, Example 7 includes depolymerization of waste CFRP after crushing. Example 8 includes depolymerization of waste CFRP after dipping in acetic acid. Example 9 includes depolymerization of waste CFRP after crushing and dipping in acetic acid.

Example 1: Decomposition of Cured Epoxy Resin Material, CFRP Using Aqueous Sodium Hypochlorite (NaOCl) Solution and Separation of Filler (Carbon Fiber)

The cured epoxy resin material used in Example 1 is a waste CFRP. The waste CFRP includes a cured epoxy resin obtained by using a bisphenol A diglycidyl ether type epoxy compound containing a halogen atom and an aromatic curing agent containing an aromatic amine group, and carbon fibers. Since such CFRP uses an aromatic curing agent, it is generally known that such CFRP has relatively high difficulty in decomposition.

0.1 g of the waste CFRP is introduced to 70 mL of 2 mol/L aqueous sodium hypochlorite solution contained in an open glass container, followed by agitation at 70° C. No autoclave is used.

After 6 hours, it is shown that the epoxy resin is completely depolymerized (no epoxy resin residue is present after depolymerization as determined by thermogravimetric analysis (TGA)). Then, the carbon fibers in aqueous solution are separated through filtering, and then dried.

Figure 1B:
FIG. 1B is a photograph illustrating carbon fibers recovered in Example 1.

FIG. 1A is a photograph illustrating CFRP before carrying out depolymerization in Example 1. FIG. 1B is a photograph illustrating carbon fibers recovered in Example 1.

Figure 2:
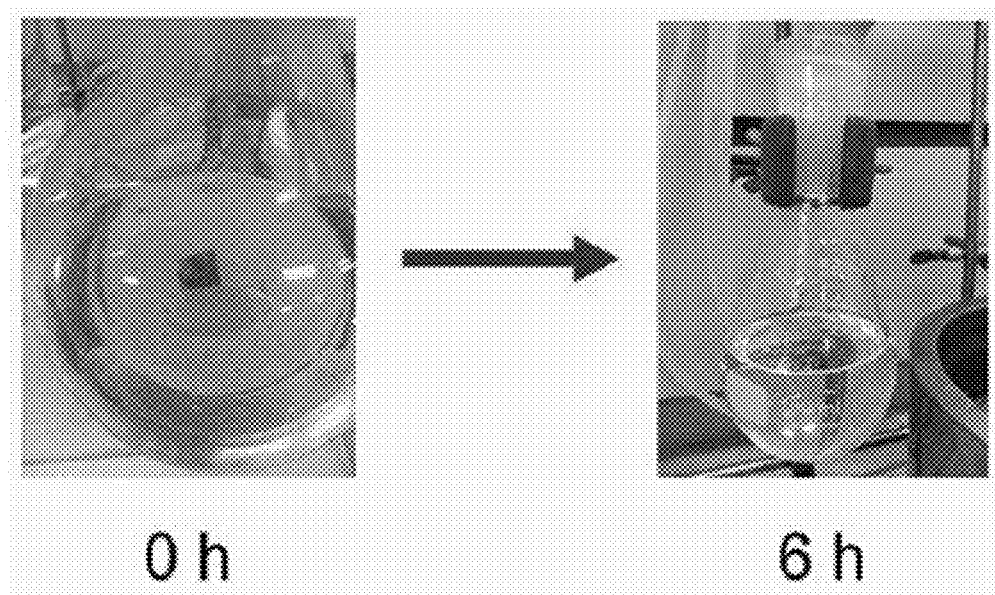
FIG. 2 is a photograph illustrating variation in aqueous sodium hypochlorite solution with time (0 hour->6 hour) in Example 1.

FIG. 2 is a photograph illustrating variation in aqueous sodium hypochlorite solution with time (0 hour->6 hour) in Example 1.

Figure 3:
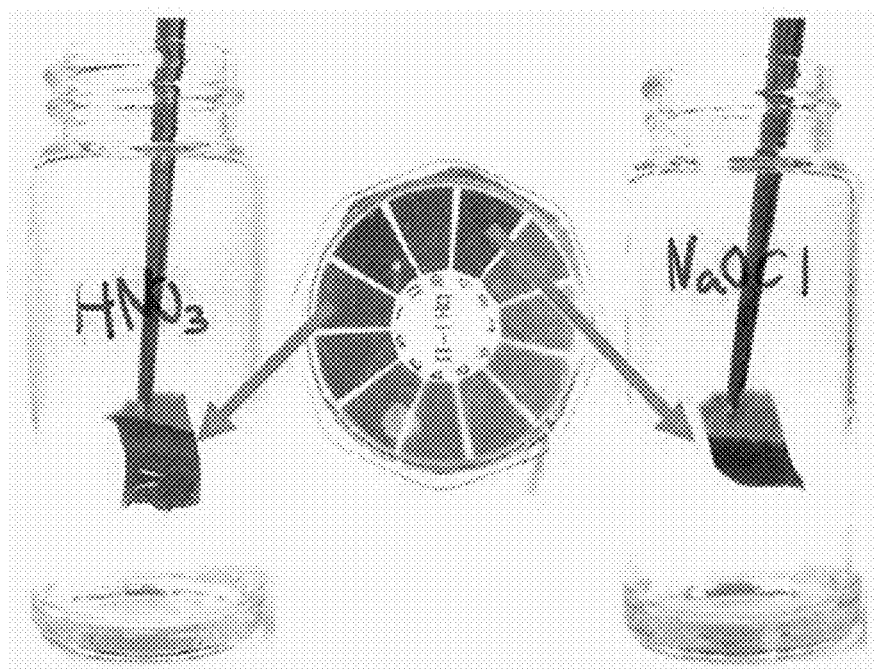
FIG. 3 shows results of pH measurement of aqueous sodium hypochlorite solution which is the reaction system of Example 1 and aqueous nitric acid solution which is the reaction system of Comparative Example 3.

FIG. 3 shows results of pH measurement of aqueous sodium hypochlorite solution which is the reaction system of Example 1. CFRP is contained in the aqueous sodium hypochlorite solution.

Meanwhile, the time at which the depolymerization (decomposition) of epoxy resin is completed is shown in Table 1, the results of viscosity of aqueous sodium hypochlorite solution measured by using a Brookfield viscometer after filtering carbon fibers and pH measurements are shown in Table 2. Variations in tensile strength and electroconductivity of carbon fibers before and after decomposition are shown in Table 3. In addition, details of variations in electroconductivity are shown in Table 4.

In addition, NMR analysis is also carried out in order to determine that the depolymerized product according to Example 1 is substituted with R radicals (CI radicals in Example 1) to form C—Y bonds.

Particularly, the aqueous solution type product remaining after filtering the carbon fibers in Example 1 is extracted with dichloromethane and dried to obtain a solid mixture, and the solid mixture is analyzed.

In the case of NMR analysis, 600 MHz NMR spectrometer available from Agilent Technology Company is used, and hydrogen nuclei are determined by using deuterium-substituted chloroform as solvent.

In the case of GC analysis, GC-2010 Plus instrument available from Shimadzu Company is used, and gas chromatography of the mixture is carried out by using dichloromethane as solvent.

In the case of GC-MS analysis, GCMS-QP2010 instrument available from Shimadzu Company is used, and the compound having a molecular weight of 30-350 is detected based on the GC results obtained beforehand.

In the case of FT-IR, Nicolet iS 10 instrument available from ThermoScientific Company is used, and pellets are formed by using the solid mixture and potassium bromide and determination is carried out in a wavenumber range of 500 $cm^{-1}$ to 4000 $cm^{-1}$.

FIGS. 6-8 show the results of structural analysis (NMR, GC, GCMS, FT-IR) of the products obtained from Example 1.

Figure 6A:
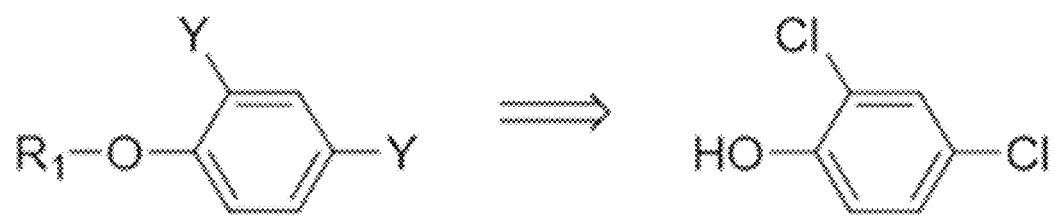
FIG. 6A shows a depolymerized product example 1 in Example 1.
Figure 6D:
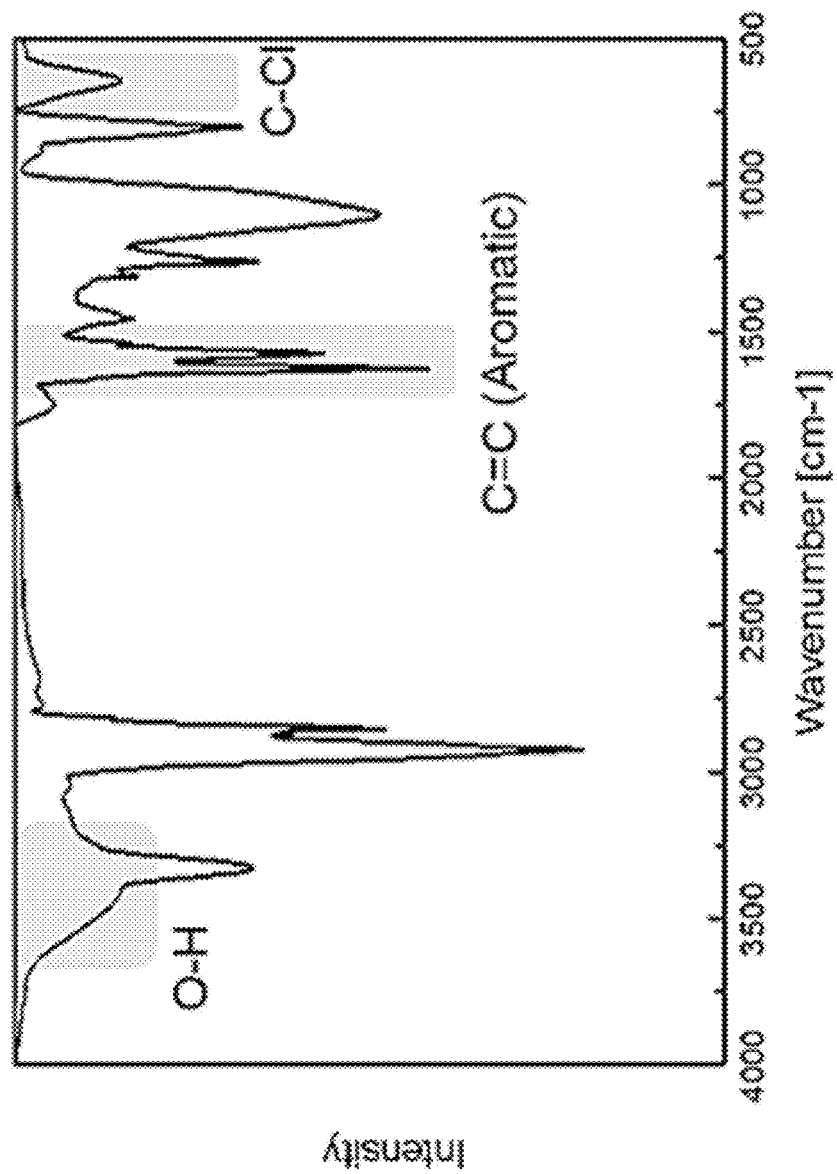
FIG. 6D shows a result of FT-IR of $H_2O$ reaction system after depolymerization for the depolymerized product example 1 in Example 1.
Figure 6E:
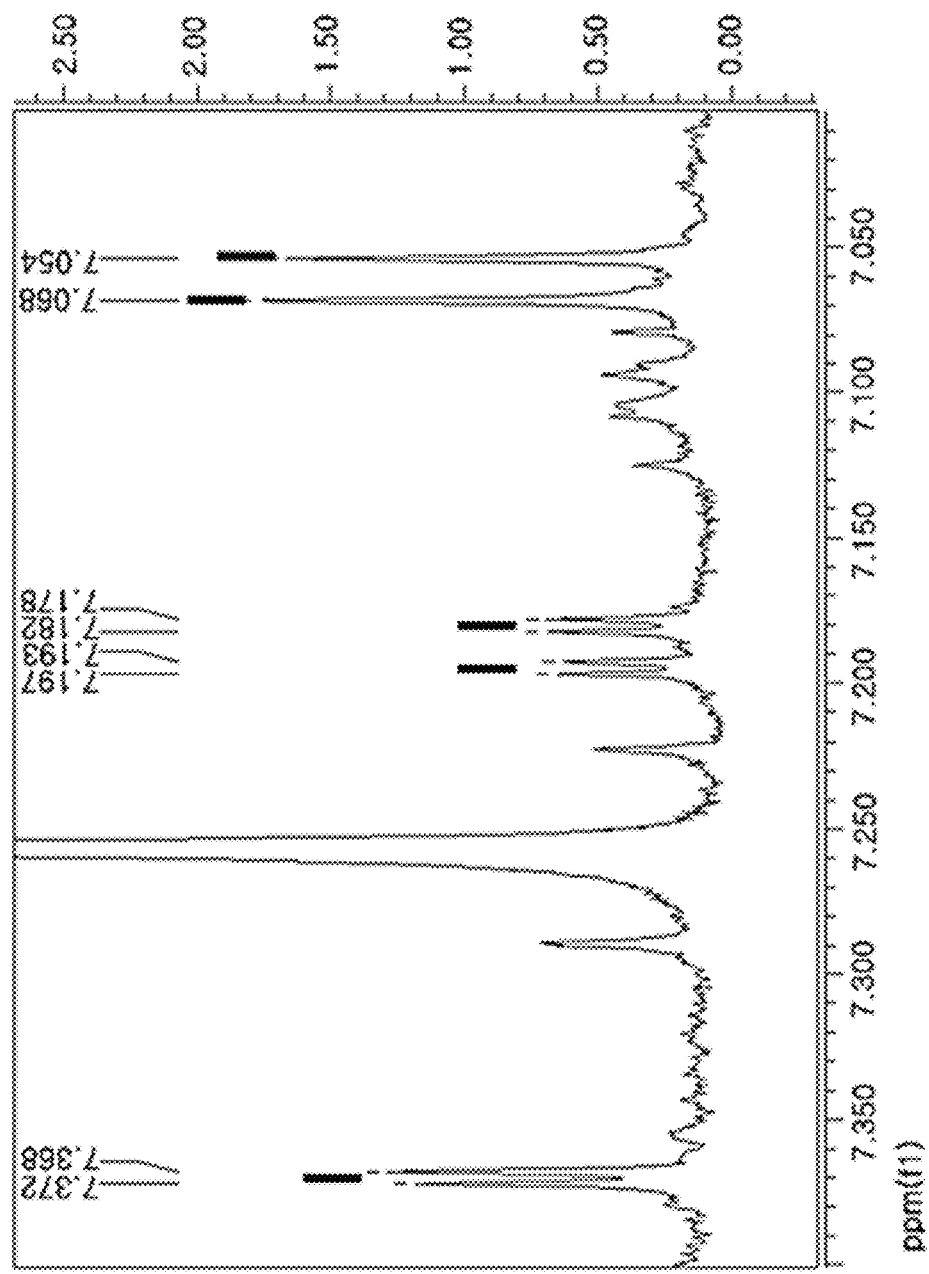
FIG. 6E shows a result of $H^1$-NMR of $H_2O$ reaction system after depolymerization for the depolymerized product example 1 in Example 1, wherein the result is directed to an analysis of H in the range of 9-6 ppm.
Figure 6F:
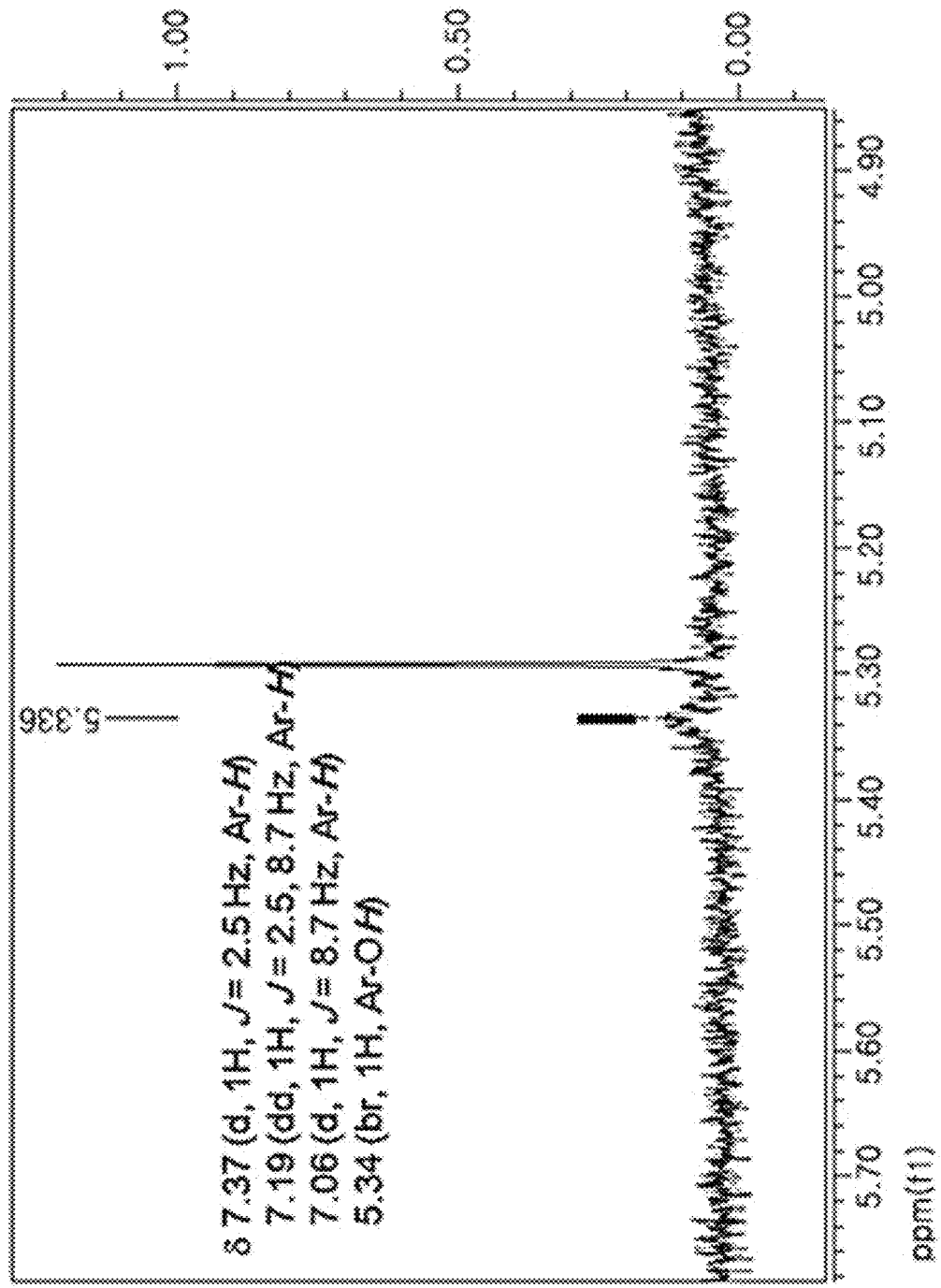
FIG. 6F shows a result of $H^1$-NMR of $H_2O$ reaction system after depolymerization for the depolymerized product example 1 in Example 1, wherein the result is directed to an analysis of H in the range of 6-3 ppm.

In particular, FIG. 6A shows a depolymerized product example 1 in Example 1. FIG. 6B shows a result of GC analysis of $H_2O$ reaction system after depolymerization for the depolymerized product example 1 in Example 1. FIG. 6C shows GC-MS at a retention time of 6.125 in the GC analysis result. FIG. 6D shows a result of FT-IR of $H_2O$ reaction system after depolymerization for the depolymerized product example 1 in Example 1. FIG. 6E shows a result of $H^1$-NMR of $H_2O$ reaction system after depolymerization for the depolymerized product example 1 in Example 1, wherein the result is directed to an analysis of H in the range of 9-6 ppm. FIG. 6F shows a result of $H^1$-NMR of $H_2O$ reaction system after depolymerization for the depolymerized product example 1 in Example 1, wherein the result is directed to an analysis of H in the range of 6-3 ppm.

Figure 7A:
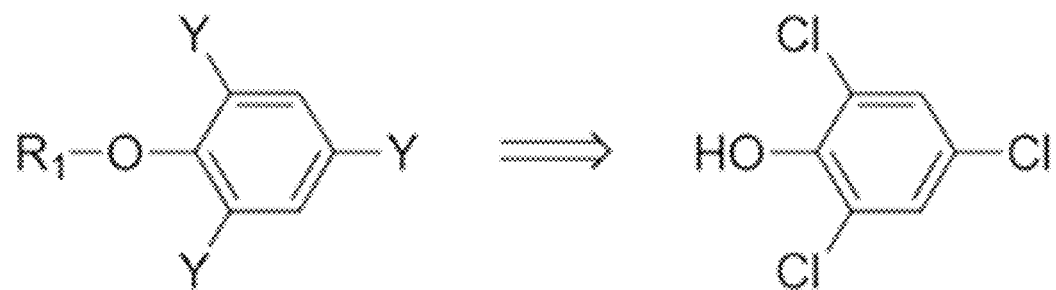
FIG. 7A shows a depolymerized product example 2 in Example 1.
Figure 7B:
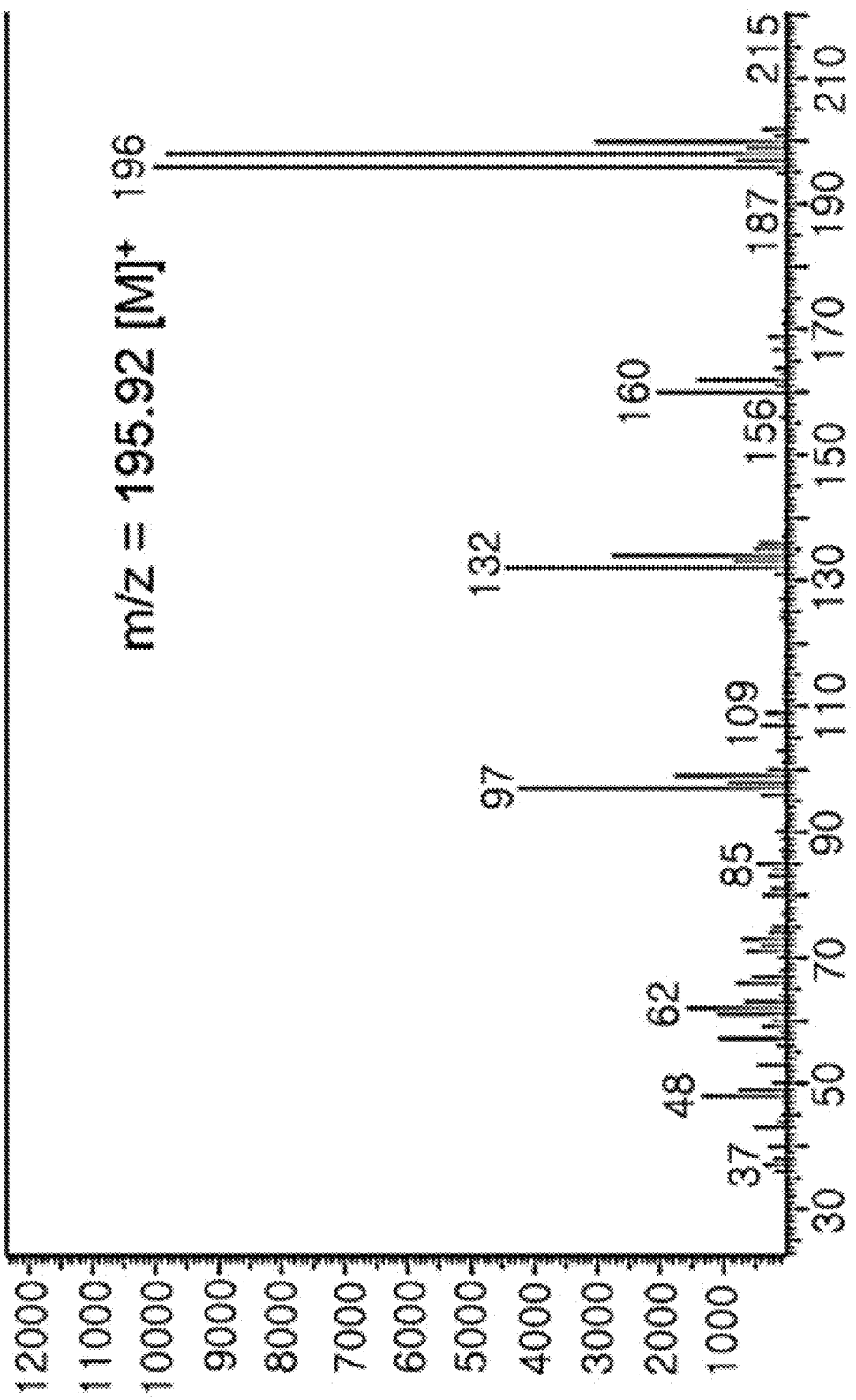
FIG. 7B shows a result of GC analysis of $H_2O$ reaction system after depolymerization for the depolymerized product example 2 in Example 1.
Figure 7D:
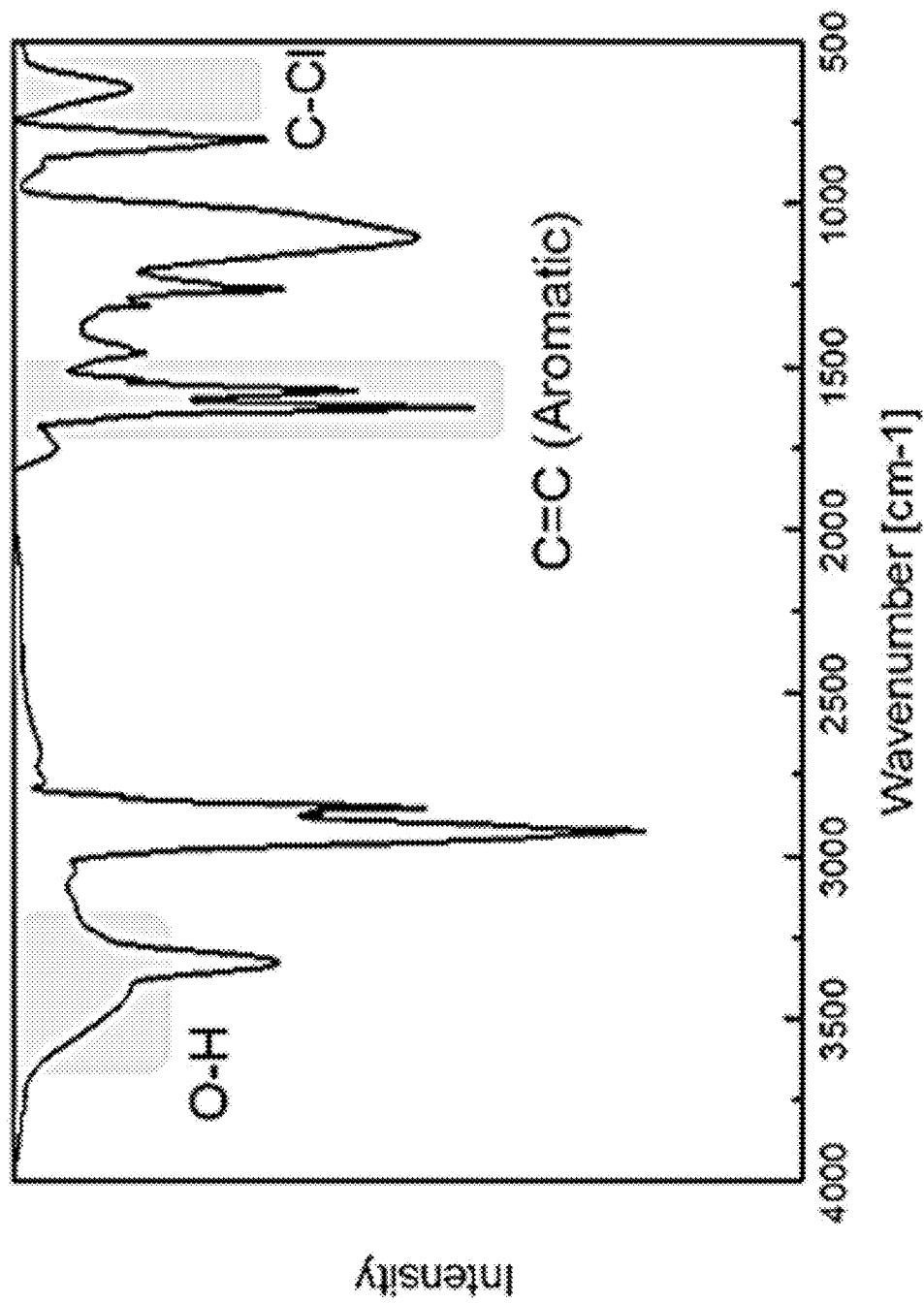
FIG. 7D shows a result of FT-IR of $H_2O$ reaction system after depolymerization for the depolymerized product example 2 in Example 1.

FIG. 7A shows a depolymerized product example 2 in Example 1. FIG. 7B shows a result of GC analysis of $H_2O$ reaction system after depolymerization for the depolymerized product example 2 in Example 1. FIG. 7C shows GC-MS at a retention time of 7.925 in the GC analysis result. FIG. 7D shows a result of FT-IR of $H_2O$ reaction system after depolymerization for the depolymerized product example 2 in Example 1. FIG. 7E shows a result of $H^1$-NMR of $H_2O$ reaction system after depolymerization for the depolymerized product example 2 in Example 1, wherein the result is directed to an analysis of H in the range of 9-6 ppm.

Figure 8A:
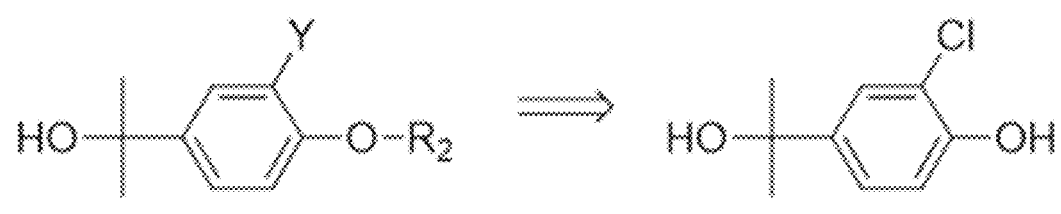
FIG. 8A shows a depolymerized product example 3 in Example 1.
Figure 8C:
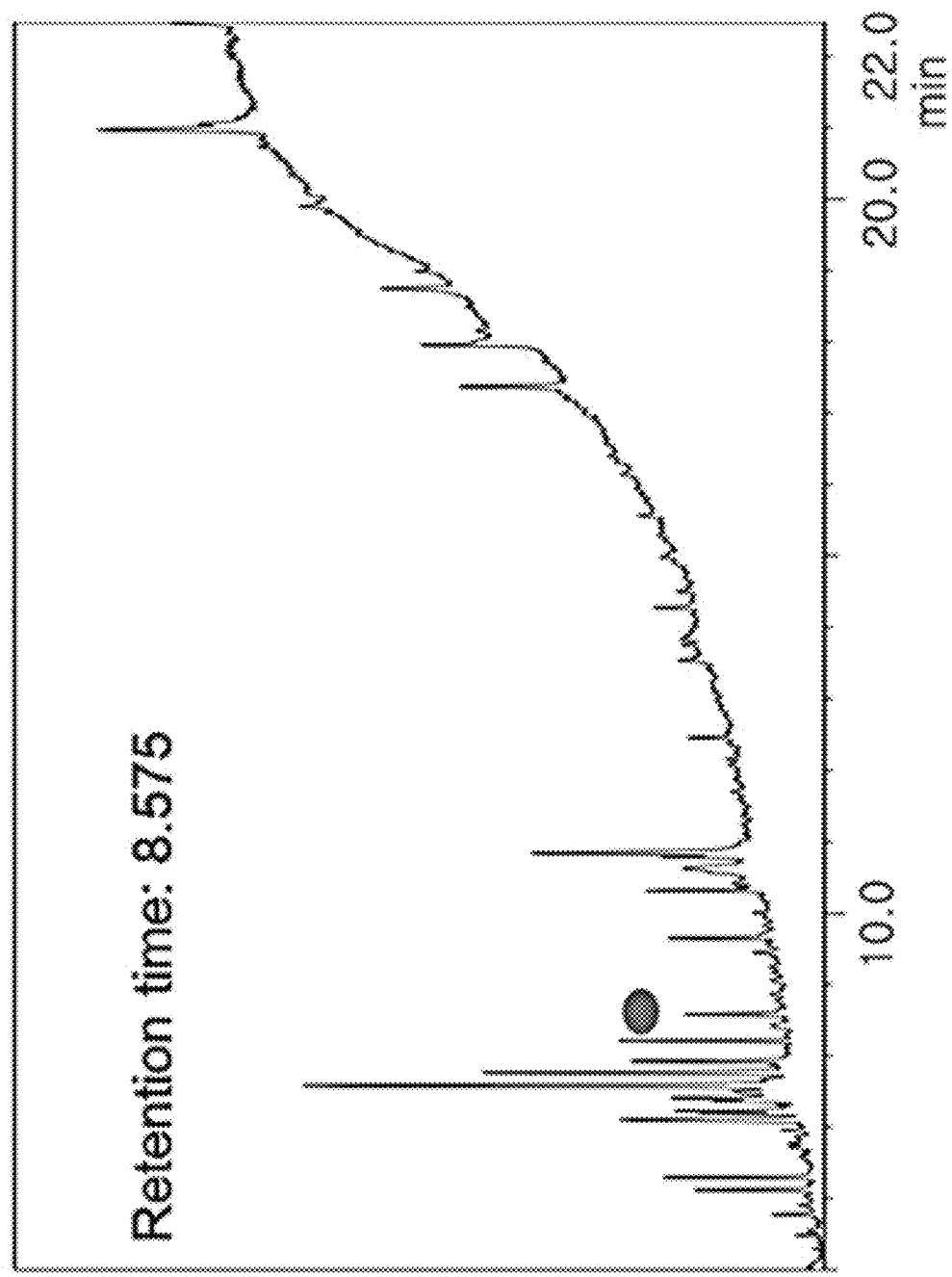
FIG. 8C shows GC-MS at a retention time of 8.575 in the GC analysis result.
Figure 8D:
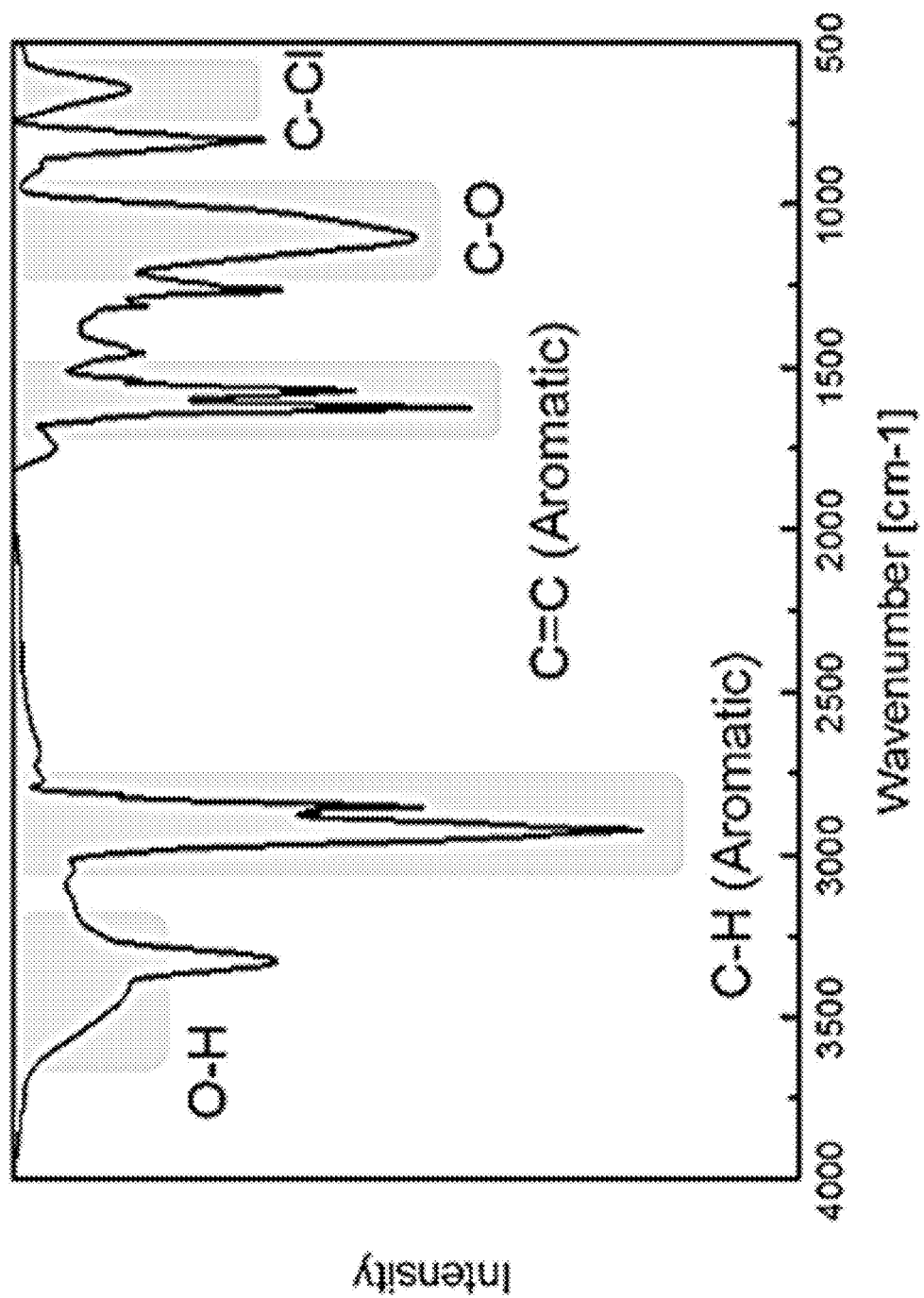
FIG. 8D shows a result of FT-IR of $H_2O$ reaction system after depolymerization for the depolymerized product example 3 in Example 1.
Figure 8F:
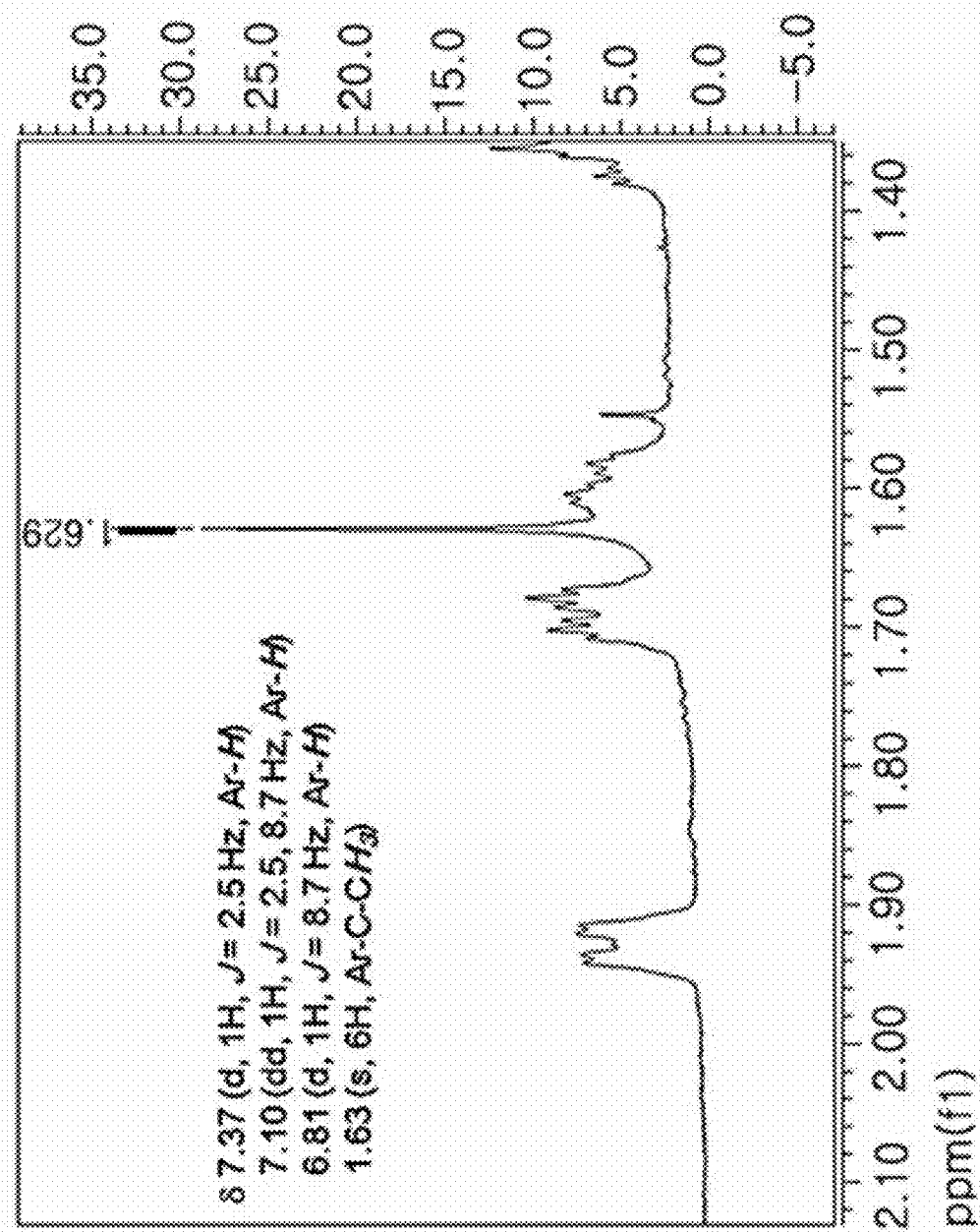
FIG. 8F shows a result of $H^1$-NMR of $H_2O$ reaction system after depolymerization for the depolymerized product example 3 in Example 1, wherein the result is directed to an analysis of H in the range of 3-1 ppm.

FIG. 8A shows a depolymerized product example 3 in Example 1. FIG. 8B shows a result of GC analysis of $H_2O$ reaction system after depolymerization for the depolymerized product example 3 in Example 1. FIG. 8C shows GC-MS at a retention time of 8.575 in the GC analysis result. FIG. 8D shows a result of FT-IR of $H_2O$ reaction system after depolymerization for the depolymerized product example 3 in Example 1. FIG. 8E shows a result of $H^1$-NMR of $H_2O$ reaction system after depolymerization for the depolymerized product example 3 in Example 1, wherein the result is directed to an analysis of H in the range of 9-6 ppm. FIG. 8F shows a result of $H^1$-NMR of $H_2O$ reaction system after depolymerization for the depolymerized product example 3 in Example 1, wherein the result is directed to an analysis of H in the range of 3-1 ppm.

As can be seen from FIGS. 6-8, three types of compounds having C—Y bonds are present based on the results of NMR, GC-MS and IR. Therefore, it can be seen that the solid mixture (i.e. depolymerized product of a cured epoxy resin material) includes compounds having C—Y bonds.

Example 2: Decomposition of Filler (Graphene)-Containing Cured Epoxy Resin Material Using Aqueous Sodium Hypochlorite (HOCl) Solution and Separation of Filler (Graphene)

The cured epoxy resin material used in Example 2 consists of a cured epoxy resin obtained by using a cresol novolak glycidyl ether type epoxy compound and a curing agent containing an aromatic amine group, and graphene. Since such cured epoxy resin material uses a novolak epoxy compound and an aromatic curing agent, it is generally known to have high difficulty in decomposition.

0.1 g of the cured epoxy resin material is introduced to 70 mL of 2 mol/L aqueous sodium hypochlorite solution contained in an open glass container, followed by agitation at 70° C. No autoclave is used.

After 5.5 hours, it is shown that the epoxy resin is completely depolymerized (no epoxy resin residue is present after depolymerization as determined by thermogravimetric analysis (TGA)). Then, graphene in aqueous solution are separated through filtering, and then dried.

The time at which depolymerization (decomposition) of an epoxy resin is completed is shown in Table 1, and the results of heat conductivity of the graphene used for the cured epoxy resin material of Example 2 and that of graphene recovered from Example 2 are shown in Table 3.

Example 3: Decomposition of Cured Epoxy Resin Material, CFRP Using Gaseous Aqueous Sodium Hypochlorite (NaOCl) Solution and Separation of Filler (Carbon Fiber)

0.1 g of the same CFRP as used in Example 1 is placed on the iron net in the upper part of the autoclave containing 70 mL of 2 mol/L aqueous sodium hypochlorite solution. Then, the liquid inlet and CFRP inlet of the autoclave are sealed and the autoclave is heated to 120° C. In this manner, gaseous aqueous sodium hypochlorite solution is supplied to the CFRP.

The time at which CFRP is depolymerized (decomposed) completely is shown in Table 1.

After 8 hours, it is shown that the epoxy resin is completely depolymerized (decomposition) (no epoxy resin residue is present after depolymerization as determined by thermogravimetric analysis (TGA)). Next, water is introduced from the upper part of the autoclave so that the product obtained by decomposition of epoxy resin may be dissolved, and the resultant solution may be transferred to the bottom of the autoclave. Then, the carbon fibers remaining on the iron net are separated and dried.

Example 4: Decomposition of Cured Epoxy Resin Material, CFRP Using Supercritical Aqueous Sodium Hypochlorite (NaOCl) Solution and Separation of Filler (Carbon Fiber)

0.1 g of the same CFRP as used in Example 1 is introduced to 70 mL of 2 mol/L aqueous sodium hypochlorite solution contained in a batch reactor equipped with a pressure gauge, and the reactor is sealed and heated with an electric heating jacket to 374° C. At that time, the pressure displayed on the pressure gauge is 221 bar.

After 1 hour, the reactor is cooled to a room temperature and it is determined whether CFRP in the reactor is decomposed or not.

The reaction time is increased at an interval of 1 hour, and the time at which the epoxy resin is completely depolymerized (decomposed) is shown in Table 1.

After 2 hours, it is shown that the epoxy resin is completely depolymerized (decomposition) (no epoxy resin residue is present after depolymerization as determined by thermogravimetric analysis (TGA)). Then, the carbon fibers in the reactor are separated and dried.

Example 5: Decomposition of Cured Epoxy Resin Material, CFRP Using Aqueous Sodium Hypochlorite (NaOCl) Solution and Separation of Filler (Carbon Fiber): Increased Amount of CFRP is Used Herein Meanwhile, in this Example 5, Example 1 is repeated (i.e., introduction to 70 mL of 2 mol/L aqueous sodium hypochlorite solution, agitation at 70° C.), except that a waste CFRP is used in an amount increased to 16 times (i.e., 1.6 g) of the amount of the waste CFRP in Example 1. After 12 hours, the depolymerization (decomposition) of the epoxy resin is determined by TGA and the carbon fibers in aqueous solution are separated through filtering and dried. The time at which the depolymerization (decomposition) is completed is shown in Table 1.

Example 6: Decomposition of Cured Epoxy Resin Material, CFRP Using Aqueous Sodium Hypochlorite (NaOCl) Solution and Separation of Filler (Carbon Fiber): Increased Amount of CFRP is Used Herein In this Example 6, 1.0 g of the waste CFRP used in Example 1 (amount increased to 10 times of the amount of CFRP used in Example 1) is introduced to 100 mL of 4 mol/L aqueous sodium hypochlorite solution contained in an open glass container, and agitated at 90° C. No autoclave is used.

After 8 hours, it is shown that the epoxy resin is completely depolymerized (decomposed) (no epoxy resin residue is present after depolymerization as determined by thermogravimetric analysis (TGA)). Then, the carbon fibers in the aqueous solution are separated and dried.

The time at which the depolymerization (decomposition) is completed is shown in Table 1. In addition, the results of measurement of tensile strength and electroconductivity of the carbon fibers recovered from Example 6 are shown in Table 3.

Example 7: Decomposition of Cured Epoxy Resin Materia, CFRP Using Aqueous Sodium Hypochlorite (NaOCl) Solution and Separation of Filler (Carbon Fiber): Depolymerization is Performed after Crushing CFRP 1.0 kg of the waste CFRP used in Example 1 is crushed into pieces having an average diameter of 2.0 mm by using Barley Grinder Crusher manual crusher available from Wellborn Company (China).

The other conditions are the same as Example 6. That is, 1.0 g of the crushed waste CFRP pieces is introduced to 100 mL of 4 mol/L aqueous sodium hypochlorite solution contained in an open glass container, and agitated at 90° C. No autoclave is used.

After 4 hours, it is shown that the epoxy resin is completely depolymerized (decomposed) (no epoxy resin residue is present after depolymerization as determined by thermogravimetric analysis (TGA)). Then, the carbon fibers in the aqueous solution are separated and dried. The time at which the depolymerization (decomposition) is completed is shown in Table 1.

Example 8: Decomposition of Cured Epoxy Resin Material, CFRP Using Aqueous Sodium Hypochlorite (NaOCl) Solution and Separation of Filler (Carbon Fiber): Depolymerization is Performed after Dipping of CFRP 1.0 g of the waste CFRP used in Example 1 is introduced to 100 mL of 99% acetic acid and heated at 120° C. for 30 minutes. The waste CFRP is separated and then washed with 20 mL of acetone.

The other conditions are the same as Example 6. That is, the washed CFRP is introduced to 100 mL of 4 mol/L aqueous sodium hypochlorite solution contained in an open glass container, and agitated at 90° C. No autoclave is used.

After 5 hours, it is shown that the epoxy resin is completely depolymerized (decomposed) (no epoxy resin residue is present after depolymerization as determined by thermogravimetric analysis (TGA)). Then, the carbon fibers in aqueous solution are separated and dried.

The time at which the depolymerization (decomposition) is completed is shown in Table 1. In addition, the results of measurement of tensile strength and electroconductivity of the carbon fibers recovered from Example 8 are shown in Table 3.

Example 9: Decomposition of Cured Epoxy Resin Material, CFRP Using Aqueous Sodium Hypochlorite (NaOCl) Solution and Separation of Filler (Carbon Fiber): Depolymerization is Performed after Crushing and Dipping CFRP 1.0 kg of the waste CFRP used in Example 1 is crushed into pieces having an average diameter of 2.0 mm by using Micro Hammer Cutter Mill automatic crusher available from Glen Creston Company (England).

Next, 1.0 g of the crushed waste CFRP pieces is introduced to 100 mL of 99% acetic acid and heated at 120° C. for 30 minutes. Then, filtering is carried out by using cellulose filter paper available from Advantec Company to separate the waste CFRP, followed by washing with 20 mL of acetone.

After that, 1.0 g of the washed waste CFRP pieces are introduced to 100 mL of 4 mol/L aqueous sodium hypochlorite solution contained in an open glass container, and agitated at 90° C. No autoclave is used.

After 3 hours, it is shown that the epoxy resin is completely depolymerized (decomposed) (no epoxy resin residue is present after depolymerization as determined by thermogravimetric analysis (TGA)). Then, the carbon fibers in the aqueous solution are separated and dried. The time at which the depolymerization (decomposition) is completed is shown in Table 1.

Example 10: Decomposition of Filler (Graphene Oxide)-Containing Cured Epoxy Resin Material Using Aqueous Hydroiodic Acid ($HIO_3$) Solution and Separation of Filler (Graphene Oxide)

The cured epoxy resin material used in Example 10 consist of a cured epoxy resin obtained by using a glycidyl amine type epoxy compound and a curing agent containing an acid anhydride group, and graphene oxide.

0.1 g of the cured epoxy resin material is introduced to 70 mL of 2 mol/L aqueous hydroiodic acid solution contained in an open glass container, and agitated at 70° C. No autoclave is used.

After 5 hours, it is shown that the epoxy resin is completely depolymerized (decomposed) (no epoxy resin residue is present after depolymerization as determined by thermogravimetric analysis (TGA)). Then, the graphene oxide in the aqueous solution is separated through filtering and dried. The time at which the depolymerization (decomposition) is completed is shown in Table 1.

Figure 9A:
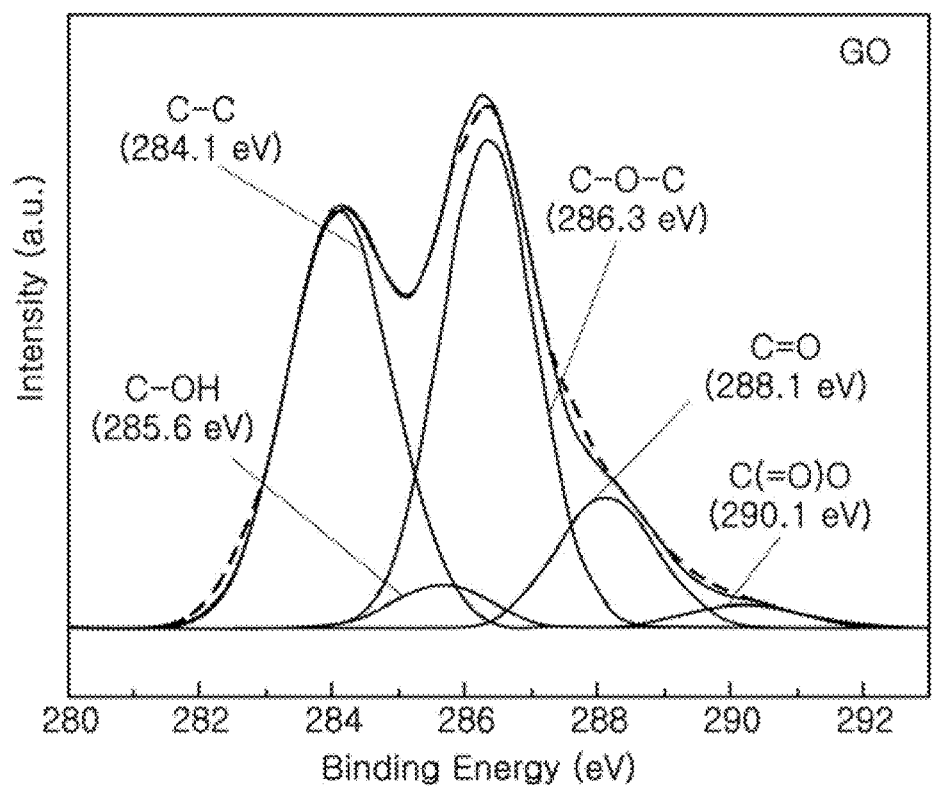
FIG. 9A shows a result of X-ray photoelectron spectroscopy of graphene oxide raw materials (GO) before the depolymerization process in Example 10.
Figure 9B:
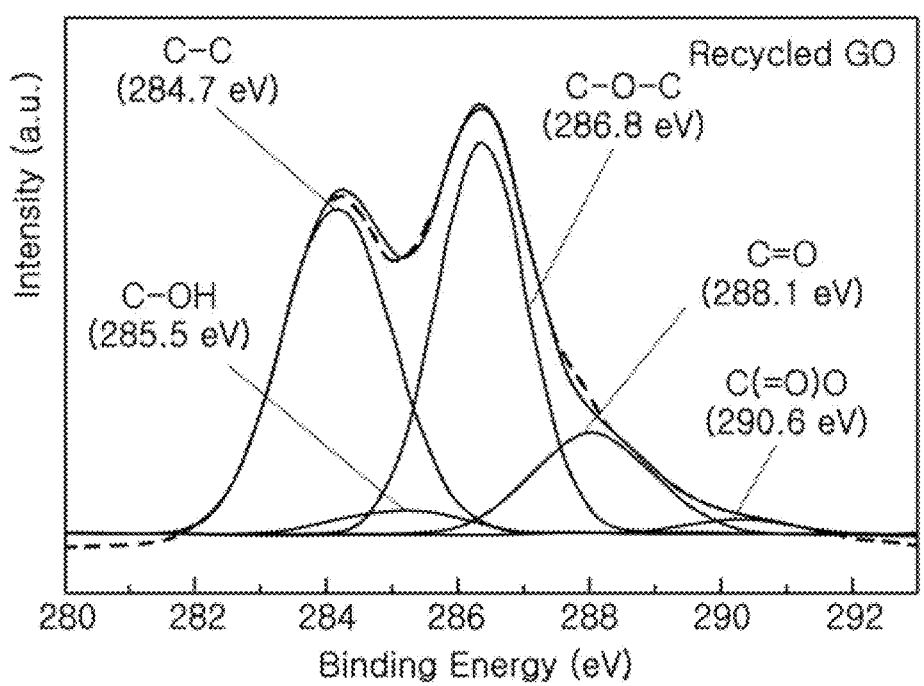
FIG. 9B shows a result of X-ray photoelectron spectroscopy of recycled graphene oxide (recycled GO) recovered after the depolymerization in Example 10.

Meanwhile, FIG. 9A shows a result of X-ray photoelectron spectroscopy of graphene oxide raw materials (GO) before the depolymerization process in Example 10. FIG. 9B shows a result of X-ray photoelectron spectroscopy of recycled graphene oxide (recycled GO) recovered after the depolymerization in Example 10.

In addition, a content of each bond and carbon and oxygen elements derived from the results of the X-ray photoelectron spectroscopy analysis are shown in Table 5. It can be seen from the results that there is little change in properties of graphene oxide before and after the decomposition process.

Example 11: Decomposition of Cured Epoxy Resin Material Containing Filler (Carbon Nanotube) Using Aqueous Perchloric Acid ($HClO_4$) Solution and Separation of Filler (Carbon Nanotube)

The cured epoxy resin material used in Example 11 consists of a cured epoxy resin obtained by using a cresol novolak glycidyl ether type epoxy compound and a curing agent containing an aromatic amine group as like in the Example 2, and carbon nanotubes.

0.1 g of the cured epoxy resin material is introduced to 70 mL of 2 mol/L aqueous perchloric acid solution contained in an open glass container, and agitated at 70° C. No autoclave is used.

After 3.5 hours, it is shown that the epoxy resin is completely depolymerized (decomposed) (no epoxy resin residue is present after depolymerization as determined by thermogravimetric analysis (TGA)). Then, the carbon nanotubes in the aqueous solution are separated through filtering and dried.

The time at which the depolymerization (decomposition) is completed is shown in Table 1. In addition, the results of measurement of heat conductivity of the carbon nanotubes used for the cured epoxy resin material in Example 11 and that of the carbon nanotubes recovered in Example 11 are shown in Table 3.

Example 12: Decomposition of Cured Epoxy Resin Material Containing Filler (Glass Fiber) Using Aqueous Hydrobromic Acid ($HBrO_3$) Solution and Separation of Filler (Glass Fiber)

The cured epoxy resin material used in Example 12 consists of a cured epoxy resin obtained by using a cresol novolak glycidyl ether type epoxy compound and a curing agent containing an aromatic amine group as in the Example 2, and glass fibers.

0.1 g of the cured epoxy resin material is introduced to 70 mL of 2 mol/L aqueous hydrobromic acid solution contained in an open glass container, and agitated at 70° C. No autoclave is used.

After 4.5 hours, it is shown that the epoxy resin is completely depolymerized (decomposed) (no epoxy resin residue is present after depolymerization as determined by thermogravimetric analysis (TGA)). Then, the glass fibers in the aqueous solution are separated through filtering and dried. The time at which the depolymerization (decomposition) is completed is shown in Table 1

Figure 10:
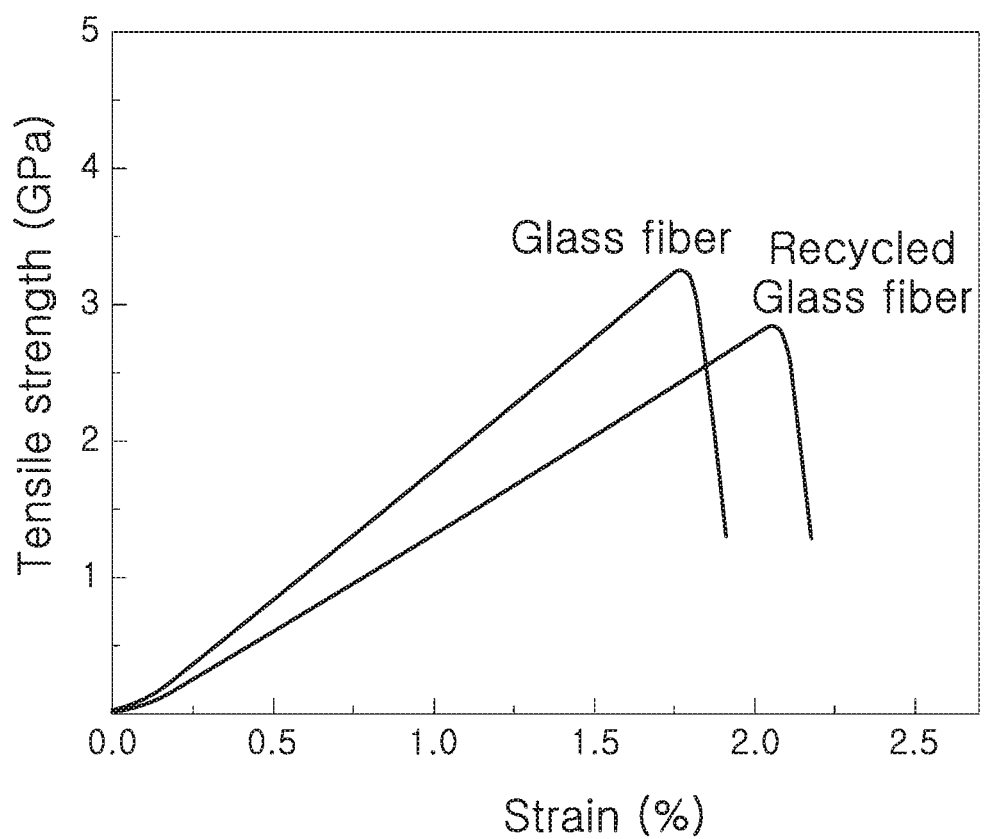
FIG. 10 is a graph illustrating results of tensile strength measurement of the glass fibers used for the cured epoxy resin material in Example 12 as compared to the glass fibers recovered in Example 12.

FIG. 10 is a graph illustrating results of tensile strength measurement of the glass fibers used for the cured epoxy resin material in Example 12 as compared to the glass fibers recovered in Example 12.

In addition, Table 3 shows variations in tensile strength of glass fibers before and after the decomposition process, as determined by the results of measurement of tensile strength. It can be seen from the results that the variation in properties is little.

Example 13: Decomposition of Cured Epoxy Resin Material Containing Filler (Alumina) Using Aqueous Chlorus Acid ($HClO_2$) Solution and Separation of Filler (Alumina)

The cured epoxy resin material used in Example 13 consists of a cured epoxy resin obtained by using a cresol novolak glycidyl ether type epoxy compound and a curing agent containing an aromatic amine group as in the Example 2, and alumina.

0.1 g of the cured epoxy resin material is introduced to 70 mL of 2 mol/L aqueous chlorus acid solution contained in an open glass container, and agitated at 70° C. No autoclave is used.

After 5 hours, it is shown that the epoxy resin is completely depolymerized (decomposed) (no epoxy resin residue is present after depolymerization as determined by thermogravimetric analysis (TGA)). Then, alumina in the aqueous solution are separated through filtering and dried.

The time at which the depolymerization (decomposition) is completed is shown in Table 1. In addition, the results of measurement of heat conductivity of alumina used for the cured epoxy resin material in Example 13 and that of alumina recovered in Example 13 are shown in Table 3.

Example 14: Decomposition of Cured Epoxy Resin Material Containing Filler (Silicon Carbide) Using Aqueous Chloric Acid ($HClO_3$) Solution and Separation of Filler (Silicon Carbide)

The cured epoxy resin material used in Example 14 consists of a cured epoxy resin obtained by using a cresol novolak glycidyl ether type epoxy compound and a curing agent containing an aromatic amine group as in the Example 2, and silicon carbide.

0.1 g of the cured epoxy resin material is introduced to 70 mL of 2 mol/L aqueous chloric acid solution contained in an open glass container, and agitated at 70° C. No autoclave is used. Meanwhile, in order to provide the cured epoxy resin material with the aqueous chloric acid solution, chlorine gas is bubbled in water and the cured epoxy resin material is dipped therein.

After 4 hours, it is shown that the epoxy resin is completely depolymerized (decomposed) (no epoxy resin residue is present after depolymerization as determined by thermogravimetric analysis (TGA)). Then, silicon carbide in the aqueous solution are separated through filtering and dried.

The time at which the depolymerization (decomposition) is completed is shown in Table 1. In addition, the results of measurement of heat conductivity of silicon carbide used for the cured epoxy resin material in Example 14 and that of silicon carbide recovered in Example 14 are shown in Table 3.

Example 15: Decomposition of Cured Epoxy Resin Material Containing Filler (Single Molecular Organic Compound) Using Aqueous Sodium Chlorate ($NaClO_3$) Solution and Separation of Filler (Organic Compound)

The cured epoxy resin material used in Example 15 consists of a cured epoxy resin obtained by using a cresol novolak glycidyl ether type epoxy compound and a curing agent containing an aromatic amine group as in the Example 2, and a single molecular organic compound, EFKA 5207, available from BASF Company.

0.1 g of the cured epoxy resin material is introduced to 70 mL of 2 mol/L aqueous sodium chlorate solution contained in an open glass container, and agitated at 70° C. No autoclave is used.

After 4.5 hours, it is shown that the epoxy resin is completely depolymerized (decomposed) (no epoxy resin residue is present after depolymerization as determined by thermogravimetric analysis (TGA)). Then, EFKA 5207 in the aqueous solution is separated by a high-performance liquid chromatography (1200 series available from Agilent Company) and dried. The time at which the depolymerization (decomposition) is completed is shown in Table 1.

[Example 16: Preparation of Aqueous Sodium Hypochlorite (NaOCl) Solution Through Mixing of Aqueous Sodium Hydroxide (NaOH) Solution with Chlorine ($Cl_2$), Decomposition of Cured Epoxy Resin Material, CFRP Using the Same and Separation of Filler (Carbon Fiber)]

0.1 g of the same waste CFRP as used in Example 1 is introduced to 70 mL of 2 mol/L aqueous sodium hydroxide solution, and agitated at 70° C. while introducing chlorine gas thereto through a separate inlet in such a manner that the total pressure of the autoclave is not decreased to 3 atm or less.

After 8 hours, it is shown that the epoxy resin is completely depolymerized (decomposed) (no epoxy resin residue is present after depolymerization as determined by thermogravimetric analysis (TGA)). Then, the carbon fibers in the aqueous solution are separated through filtering and dried. The time at which the depolymerization (decomposition) is completed is shown in Table 1.

Comparative Example 1: Decomposition of Epoxy Resin in CFRP Using Mixture of Aqueous Hydrogen Peroxide with Acetone ($H_2O_2$+Water+Acetone) and Separation of Carbon Fiber 0.1 g of the same CFRP as used in Example 1 is introduced to 11 mL of a mixture of 2 mol/L aqueous hydrogen peroxide with 33% (volume ratio based on the total volume of solvent) of acetone (i.e., 33 vol % of acetone and 67 vol % of water based on the total volume of solvent) contained in an open container, and agitated at 70° C.

Table 1 shows whether the epoxy resin is decomposed or not. In Comparative Example 1, the epoxy resin is not dissolved. Thus, it is not possible to separate carbon fibers.

Herein, OH radicals are used for decomposition of epoxy and the solution has a dielectric constant of about 44. It is thought that since it is difficult to generate radicals under such a low dielectric constant and thus OH radicals are formed in a small amount, the epoxy resin is not dissolved. Even though Comparative Example 1 uses the same CFRP as used in Examples (cured epoxy resin material using an aromatic diamine-based curing agent having significantly high difficulty in decomposition), the epoxy resin is not dissolved as opposed to Examples.

Comparative Example 2: Decomposition of Epoxy Resin in CFRP Using Mixture of Aqueous Sodium Hypochlorite (NaOCl) with Acetone and Separation of Carbon Fiber 0.1 g of the same CFRP as used in Example 1 is introduced to a mixture of 2 mol/L aqueous sodium hypochlorite solution with 33% (volume ratio based on the total volume of solvent) of acetone (i.e., 33 vol % of acetone and 67 vol % of water based on the total volume of solvent) contained in an open container, and agitated at 70° C.

Table 1 shows whether the epoxy resin is decomposed or not. In Comparative Example 2, the epoxy resin is not dissolved, and thus it is not possible to separate carbon fibers. Herein, the solution has a dielectric constant of about 44. It is thought that since it is difficult to generate radicals effectively under such a low dielectric constant, the epoxy resin is not dissolved. Even though Comparative Example 2 uses the same CFRP as used in Examples (cured epoxy resin material using an aromatic diamine-based curing agent having significantly high difficulty in decomposition), the epoxy resin is not dissolved as opposed to Examples.

Comparative Example 3: Decomposition of Epoxy Resin Using Aqueous Nitric Acid Solution and Separation of Carbon Fiber 0.1 g of the same CFRP as used in Example 1 is introduced to aqueous nitric acid solution contained in an open container, and agitated at 70° C.

Figure 4:
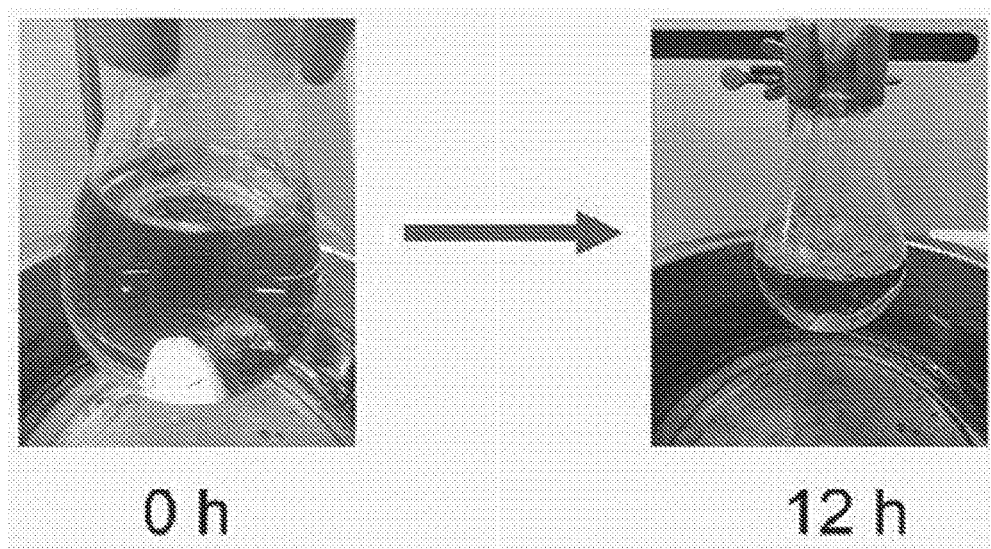
FIG. 4 is a photograph illustrating variations in aqueous nitric acid solution with time (0 hour->12 hour) in Comparative Example 3.

FIG. 4 is a photograph illustrating variations in aqueous nitric acid solution with time, and FIG. 3 shows the results of pH measurement of aqueous nitric acid solution containing CFRP. In addition, the time at which the depolymerization (decomposition) is completed is shown in Table 1. Table 2 shows the results of measurement of viscosity using Brookfield viscometer and pH of aqueous nitric acid solution after filtering carbon fibers.

After 12 hours, it is shown that the epoxy resin is completely depolymerized (decomposed) (no epoxy resin residue is present after depolymerization as determined by thermogravimetric analysis (TGA)). Then, the carbon fibers in the aqueous solution are separated through filtering and dried.

[Epoxy Decomposition Test Results for Examples and Comparative Examples and Analysis of Recovered Filler Characteristic]

Table 1 shows the time required for decomposition of the epoxy resin according to each of Examples and Comparative Examples. In addition, Table 2 shows the results of measurement of pH and viscosity of the aqueous sodium hypochlorite solution and aqueous nitric acid solution obtained after filtering carbon fibers in Example 1 and Comparative Example 3.

Table 3 shows the results of heat conductivity, tensile strength and electroconductivity of the fillers according to Examples, before and after carrying out depolymerization. Table 4 shows the results of electroconductivity of table 1 in detail. Table 5 shows the analysis results of each bond and contents of carbon and oxygen elements as determined by X-ray photoelectron spectroscopy in Example 10.

TABLE 1

|  | $XO_mY_n$ Compound | Reaction solvent/ Dielectric constant | Depolymerization completion time [h] |
|---|---|---|---|
| Example 1 | NaOCl | Aqueous solution (Water alone) Dielectric constant about 80.2 | 6 |
| Example 2 | HOCl | Aqueous solution (Water alone) Dielectric constant about 80.2 | 5.5 |
| Example 3 | NaOCl | Gaseous Aqueous solution (Water alone) Dielectric constant about 80.2 | 8 |
| Example 4 | NaOCl | Supercritical Aqueous solution (Water alone) Dielectric constant about 80.2 | 2 |
| Example 5 (Amount of CFRP increased to 16 times) | NaOCl | Aqueous solution (Water alone) Dielectric constant about 80.2 | 12 |
| Example 6 (Amount of CFRP increased to 10 times/Increased amount of composition) | NaOCl | Aqueous solution (Water alone) Dielectric constant about 80.2 | 8 |
| Example 7 (Amount of CFRP increased to 10 times/Increased amount of composition) (Depolymerization after crushing) | NaOCl | Aqueous solution (Water alone) Dielectric constant about 80.2 | 4 |
| Example 8 (Amount of CFRP increased to 10 times/Increased amount of composition) (Depolymerization after dipping) | NaOCl | Aqueous solution (Water alone) Dielectric constant about 80.2 | 5 |
| Example 9 (Amount of CFRP increased to 10 times/Increased amount of composition) (Depolymerization after crushing and dipping) | NaOCl | Aqueous solution (Water alone) Dielectric constant about 80.2 | 3 |
| Example 10 | $HIO_3$ | Aqueous solution (Water alone) Dielectric constant about 80.2 | 5 |
| Example 11 | $HClO_4$ | Aqueous solution (Water alone) Dielectric constant about 80.2 | 3.5 |
| Example 12 | $HBrO_3$ | Aqueous solution (Water alone) Dielectric constant about 80.2 | 4.5 |
| Example 13 | $HClO_2$ | Aqueous solution (Water alone) Dielectric constant about 80.2 | 5 |
| Example 14 | $HClO_3$ | Aqueous solution (Water alone) Dielectric constant about 80.2 | 4 |

TABLE 1-continued

| | $XO_mY_n$ Compound | Reaction solvent/ Dielectric constant | Depolymerization completion time [h] |
|---|---|---|---|
| Example 15 | $NaClO_3$ | Aqueous solution (Water alone) Dielectric constant about 80.2 | 4.5 |
| Example 16 | $NaOH + Cl_2$ (NaOCl produced) | Aqueous solution (Water alone) Dielectric constant about 80.2 | 8 |
| Comparative Example 1 | — (hydrogen peroxide used) | Water + Acetone Dielectric constant about 44 | Not dissolved |
| Comparative Example 2 | NaOCl | Water + Acetone Dielectric constant about 44 | Not dissolved |
| Comparative Example 3 | — (nitric acid used) | Aqueous solution (Water alone) Dielectric constant about 80.2 | 12 |

TABLE 2

| | Aqueous sodium hypochlorite solution (Example 1) | Aqueous nitric acid solution (Comparative Example 3) |
|---|---|---|
| pH | 9 | <1 |
| Viscosity [cP] | 10 | 30000 |

TABLE 3

| Example (Filler) | Heat conductivity before/after depolymerization [W/mK, 25° C.] | Tensile strength before/after depolymerization [GPa] | Electroconductivity before/after depolymerization [S/cm] |
|---|---|---|---|
| Example 1 (Carbon fibers) | — | 4.0 (Before) 3.7 (After) | 504.5 (Before) 657.5 (After) |
| Example 2 (Graphene) | 4540 (Before) 4041 (After) | — | — |
| Example 6 (Carbon fibers) | — | 4.0 (Before) 3.7 (After) | 504.5 (Before) 627.5 (After) |
| Example 8 (Carbon fibers) | — | 4.0 (Before) 3.8 (After) | 504.5 (Before) 628.7 (After) |
| Example 11 (Carbon nanotubes) | 3111 (Before) 2769 (After) | — | — |
| Example 12 (Glass fibers) | — | 3.2 (Before) 2.9 (After) | — |
| Example 13 (Alumina) | 31.2 (Before) 28.4 (After) | — | — |
| Example 14 (Silicon carbide) | 167 (Before) 157 (After) | — | — |

TABLE 4

| | Carbon fibers before use (Example 1) | Recovered carbon fibers (Example 1) |
|---|---|---|
| Voltage [V] | 4.15 | 4.19 |
| Current [mA] | 1.0 | 1.0 |
| Resistance [kΩ] | 4.15 | 4.19 |
| Length [cm] | 1.0 | 1.0 |
| Thickness [m] | 7.8 | 6.8 |
| Surface area [$m^2$] | 47.8 | 36.3 |
| Conductivity [S/cm] | 504.5 | 657.5 |

TABLE 5

| | Graphene oxide before use (Example 10) | Recovered graphene oxide (Example 10) |
|---|---|---|
| C—C Content | 39.7% | 40.5% |
| C—OH Content | 3.6% | 3.7% |
| C—O—C Content | 41.3% | 40.2% |
| C=O Content | 12.5% | 13.7% |
| C(=O)—O Content | 2.9% | 1.9% |
| Carbon element content | 66.5% | 65.7% |
| Oxygen element content | 33.5% | 34.3% |

As can be seen from Examples and Comparative Examples of Table 1, the reaction time is relatively very short at low reaction temperature according to Examples. On the contrary, when using acetone in an amount of about 33 vol % based on the total volume of reaction solvent according to Comparative Examples 1 and 2 (dielectric constant: about 44), it can be seen that the cured epoxy resin material is not decomposed.

Meanwhile, when using aqueous nitric acid solution according to Comparative Example 3, the reaction time is two times longer than Example 1 using the aqueous sodium hypochlorite solution. As can be seen from Table 2, the composition used in Example 1 has a higher pH value than the aqueous nitric acid solution, and the mixture produced after decomposing a cured epoxy resin material also shows lower viscosity as compared to nitric acid and is not in a gel-like phase. Such a relatively low viscosity may facilitate the process as well.

Figure 5:
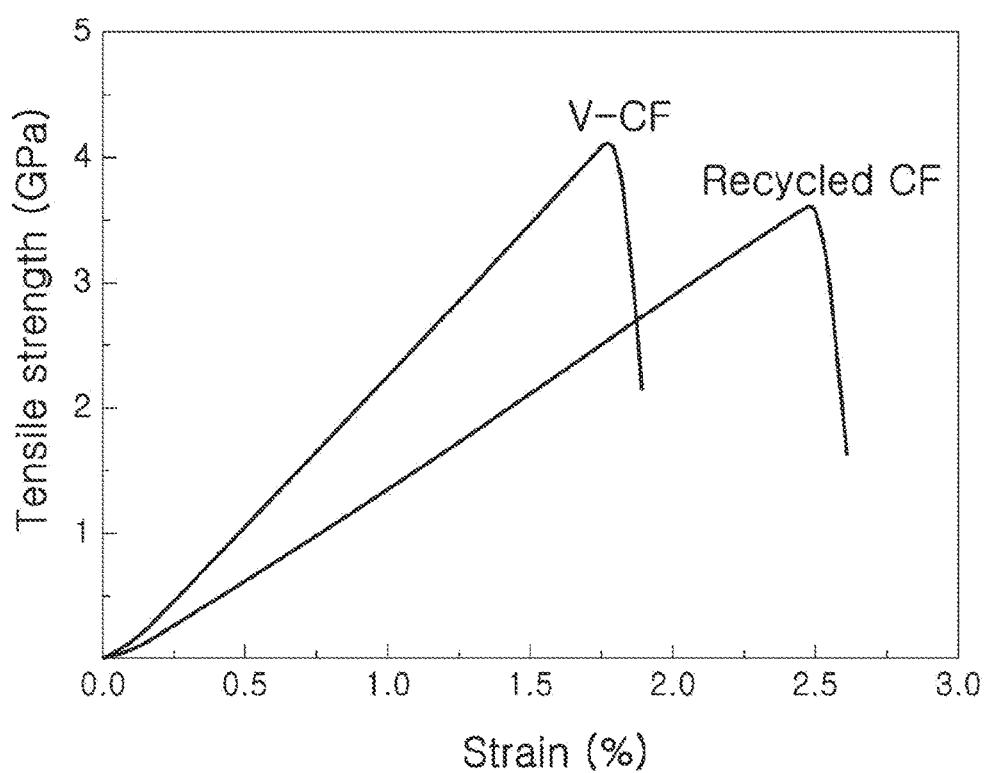
FIG. 5 is a graph illustrating results of tensile strength measurement of the carbon fibers (carbon fiber raw materials) used for CFRP in Example 1 as compared to the carbon fibers recovered in Example 1.

FIG. 5 is a graph illustrating results of tensile strength measurement of the carbon fibers (carbon fiber raw materials) used for CFRP in Example 1 as compared to the carbon fibers recovered in Example 1.

From the measuring results of the tensile strength of the carbon fibers recovered in Example 1, it can be seen that carbon fibers undergoing less degradation of tensile strength (about 13% or less) are recovered by decomposing CFRP through the method disclosed herein. By contrast, the carbon fibers recovered from CFRP through a pyrolysis process undergoes degradation of tensile strength of at least 15% or more based on the raw materials of carbon fibers (Mater. Res. Bull. 2004, 39, 1549). Thus, it can be seen that the depolymerization method disclosed herein allows recovery of carbon fibers having excellent properties.

In addition, as shown in Table 3, the results of filler properties before and after depolymerization demonstrate that it is possible to recover fillers that show little change in properties from a cured epoxy resin material by decomposing the cured epoxy resin material through the method disclosed herein.

Meanwhile, in Table 1, each of Examples 7-9 and Example 6 uses the same cured epoxy resin material and the same composition for depolymerization, except that Examples 7-9 include a pretreatment process and Example 6 includes no pretreatment process. Although depolymerization proceeds rapidly in the case of Example 6, a cured epoxy resin material may be depolymerized more rapidly if further including the pretreatment process, and depolymerization of a cured epoxy resin material is completed in the shortest time in the case of Example 9 including both a crushing process and a dipping process.

The reason why the depolymerization completion time is reduced is considered to be that the pretreatment process increases the depolymerization reaction area of the cured epoxy resin material, thereby further activating depolymerization. Such activation of depolymerization may occur both in the case of an increase in reaction area using a physical process, such as crushing, and in the case of an increase in reaction area using a chemical process, such as dipping.

As can be seen from Table 3, the carbon fibers recovered from Example 8 including a dipping process show higher tensile strength and electroconductivity as compared to the carbon fibers recovered from Example 6 including no dipping process. This suggests that the pretreatment process may further reduce the time required for depolymerization of a cured epoxy resin material and thus degradation of properties of carbon fibers that may occur during depolymerization may be further decreased.

Meanwhile, Table 4 shows the results of measurement of electroconductivity of carbon fibers used in Example 1 and that of the carbon fibers recovered from Example 1 in detail. As can be seen from Table 4, it is possible to recover carbon fibers having electroconductivity improved by 30% from CFRP by using the method disclosed herein. From the results of measurement of tensile strength and electroconductivity, it can be seen that carbon fibers having excellent properties are recovered from CFRP by decomposing CFRP through the method disclosed herein.

[Experiment 2]

Use of Mixed Solvent of Water with NMP as Reaction Solvent

In Experiment 2, a mixed solvent of water with NMP is used as a reaction solvent and the mixing ratio is varied so that its dielectric constant may be varied. Then, a degree of epoxy depolymerization is measured. Sodium hypochlorite is used as the compound. The following Table 6 shows the test conditions and results.

TABLE 6

| CFRP Weight | Acetic acid Pretreatment condition | NaOCl Depolymerization condition | Water:NMP | Mixed solvent Dielectric constant | Epoxy content before depolymerization (%) | Epoxy content after depolymerization* (%) | Decomposition ratio (%)** |
|---|---|---|---|---|---|---|---|
| 0.1 g | 120° C., 30 min. | 3M, 70 mL, 90° C. | 0:100 | 43 | 19.4 | 19.4 (after 24 hours) | 0 (after 24 hours) |
| | | | 30:70 | 51.7 | 19.4 | 17.4 (After 24 hours) | 10.3 (After 24 hours) |
| | | | 50:50 | 59.4 | 19.4 | 17.3 (After 24 hours) | 10.8 (After 24 hours) |
| | | | 60:40 | 63.8 | 19.4 | 17.1 (After 24 hours) | 11.8 (After 24 hours) |
| | | | 70:30 | 68.3 | 19.4 | 11.9 (After 24 hours) | 38.6 (After 24 hours) |
| | | | 80:20 | 73.9 | 19.4 | 9 (After 24 hours) | 53.6 (After 24 hours) |
| | | | 90:10 | 78.1 | 19.4 | 4.7 (After 24 hours) | 75.8 (After 24 hours) |
| | | | 100:0 | 80.2 | 19.4 | 0.0 (after 5 hours) | 100 (after 5 hours) |

*Epoxy resin (cured epoxy resin) content before depolymerization of CFRP is 19.4%. Epoxy resin content is measured after carrying out depolymerization for 24 hours or 5 hours (The case of 100% of water shows significant difference wherein epoxy resin residue is already 0% after 5 hours).
**Decomposition ratio (depolymerization ratio) is calculated by the following formula: Decomposition ratio = [(epoxy resin content before depolymerization of CFRP − epoxy resin content after depolymerization of CFRP)/epoxy resin content before depolymerization of CFRP] × 100

Use of Mixed Solvent of Water with DMF as Reaction Solvent

A mixed solvent of water with DMF is used as reaction solvent and the mixing ratio is varied so that its dielectric constant may be varied. Then, a degree of epoxy depolymerization is measured. Sodium hypochlorite is used as the compound. The following Table 7 shows the test conditions and results.

[Experiment 3]

Meanwhile, in Experiment 3, it is determined whether addition of a radical-providing agent accelerates depolymerization of a cured epoxy resin material or not.

In Experiment 3, Example 1 and Comparative Example 1 are as follows.

TABLE 7

| CFRP Weight | Acetic acid Pretreatment condition | NaOCl Depolymerization condition | Water:DMF | Mixed solvent Dielectric constant | Epoxy content before depolymerization (%) | Epoxy content after depolymerization* (%) | Decomposition ratio (%)** |
|---|---|---|---|---|---|---|---|
| 0.1 g | 120° C., 30 min. | 3M, 70 mL, 90° C. | 0:100 | 46.7 | 19.4 | 18.8 (after 24 hours) | 3 (after 24 hours) |
| | | | 40:60 | 65.2 | 19.4 | 17.3 (After 24 hours) | 11 (After 24 hours) |
| | | | 60:40 | 70.2 | 19.4 | 11.6 (After 24 hours) | 40 (After 24 hours) |
| | | | 67:33 | 72.2 | 19.4 | 8.7 (After 24 hours) | 55 (After 24 hours) |
| | | | 87:13 | 77.2 | 19.4 | 7.0 (After 24 hours) | 64 (After 24 hours) |

*Epoxy resin (cured epoxy resin) content before depolymerization of CFRP is 19.4%. Epoxy resin content is measured after carrying out depolymerization for 24 hours.
**Decomposition ratio (depolymerization ratio) is calculated by the following formula: Decomposition ratio = [(epoxy resin content before depolymerization of CFRP − epoxy resin content after depolymerization of CFRP)/epoxy resin content before depolymerization of CFR] × 100

Use of Mixed Solvent of Water with Acetone as Reaction Solvent

A mixed solvent of water with acetone is used as reaction solvent and the mixing ratio is varied so that its dielectric constant may be varied. Then, a degree of epoxy depolymerization is measured. Sodium hypochlorite is used as the compound. The following Table 8 shows the test conditions and results.

Example 1: Decomposition of Cured Epoxy Resin Material, CFRP Using Aqueous Sodium Hypochlorite (NaOCl) Solution and Sodium Percarbonate and Separation of Carbon Fiber The cured epoxy resin material used in Example 1 of Experiment 3 is a waste CFRP. The waste CFRP includes a cured epoxy resin obtained by using a bisphenol A digly-

TABLE 8

| CFRP Weight | Acetic acid Pretreatment condition | NaOCl Depolymerization condition | Water:acetone | Mixed solvent Dielectric constant | Epoxy content before depolymerization (%) | Epoxy content after depolymerization* (%) | Decomposition ratio (%)** |
|---|---|---|---|---|---|---|---|
| 0.1 g | 120° C., 30 min. | 3M, 70 mL, 90° C. | 0:100 | 40.3 | 19.4 | 19.4 (after 24 hours) | 0 (after 24 hours) |
| | | | 35:65 | 42.9 | 19.4 | 17.5 (After 24 hours) | 10 (After 24 hours) |
| | | | 65:35 | 62.5 | 19.4 | 16.7 (After 24 hours) | 14 (After 24 hours) |
| | | | 75:25 | 68.6 | 19.4 | 13.4 (After 24 hours) | 34 (After 24 hours) |
| | | | 88:12 | 74.8 | 19.4 | 9 (After 24 hours) | 45 (After 24 hours) |

*Epoxy resin (cured epoxy resin) content before depolymerization of CFRP is 19.4%. Epoxy resin content is measured after carrying out depolymerization for 24 hours.
**Decomposition ratio (depolymerization ratio) is calculated by the following formula: Decomposition ratio = [(epoxy resin content before depolymerization of CFRP − epoxy resin content after depolymerization of CFRP)/epoxy resin content before depolymerization of CFRP] × 100

Figure 11:
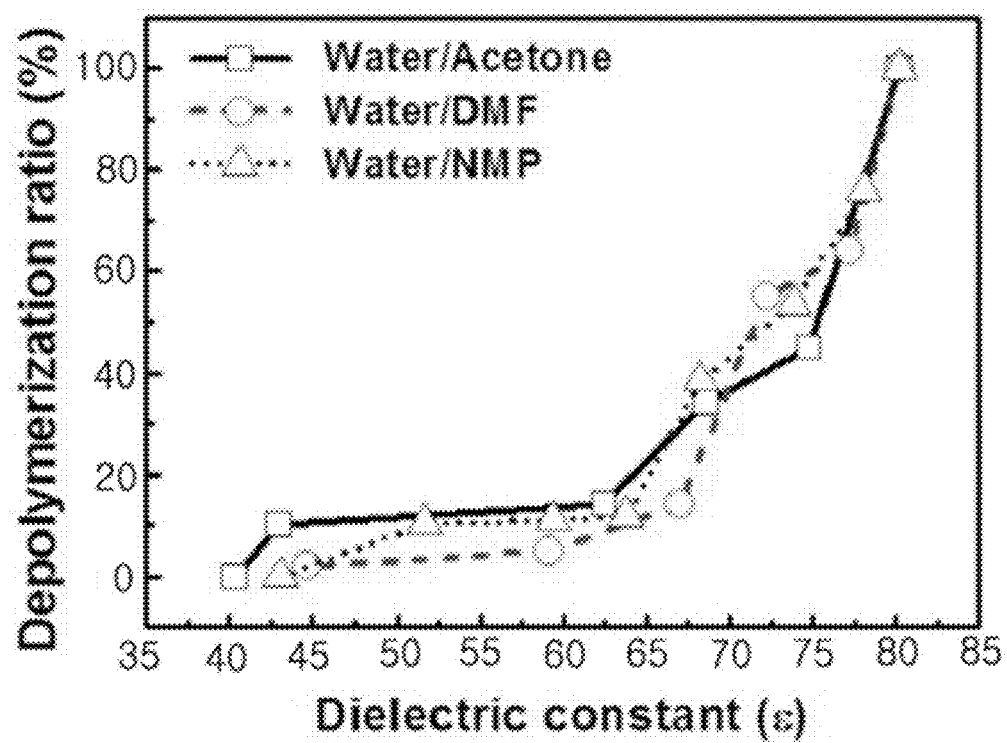
FIG. 11 is a graph illustrating a depolymerization ratio of cured resin materials as a function of dielectric constant in each of the mixed solvents in Experiment 2.

FIG. 11 is a graph illustrating a depolymerization ratio of cured resin materials as a function of dielectric constant in each of the mixed solvents in Experiment 2.

As can be seen from FIG. 11, when the dielectric constant is about 65 or more, the depolymerization ratio slope increases rapidly. Particularly, as shown in Water/NMP data, in the case of water alone, decomposition ratio already reaches 100% within 5 hours not 24 hours. This shows that when using water alone, there is a further significant increase in decomposition ratio as compared to a solvent mixed with an organic solvent.

cidyl ether type epoxy compound and a curing agent containing an aliphatic amine group, and carbon fibers.

10.7 g of the waste CFRP and 1 g of sodium percarbonate ($2Na_2CO_3 3H_2O_2$) are introduced to 2.5 L of aqueous 0.4 mol/L sodium hypochlorite solution contained in an autoclave and agitated at 150° C. After 3 hours, the carbon fibers in the aqueous solution are separated and dried.

Figure 12:
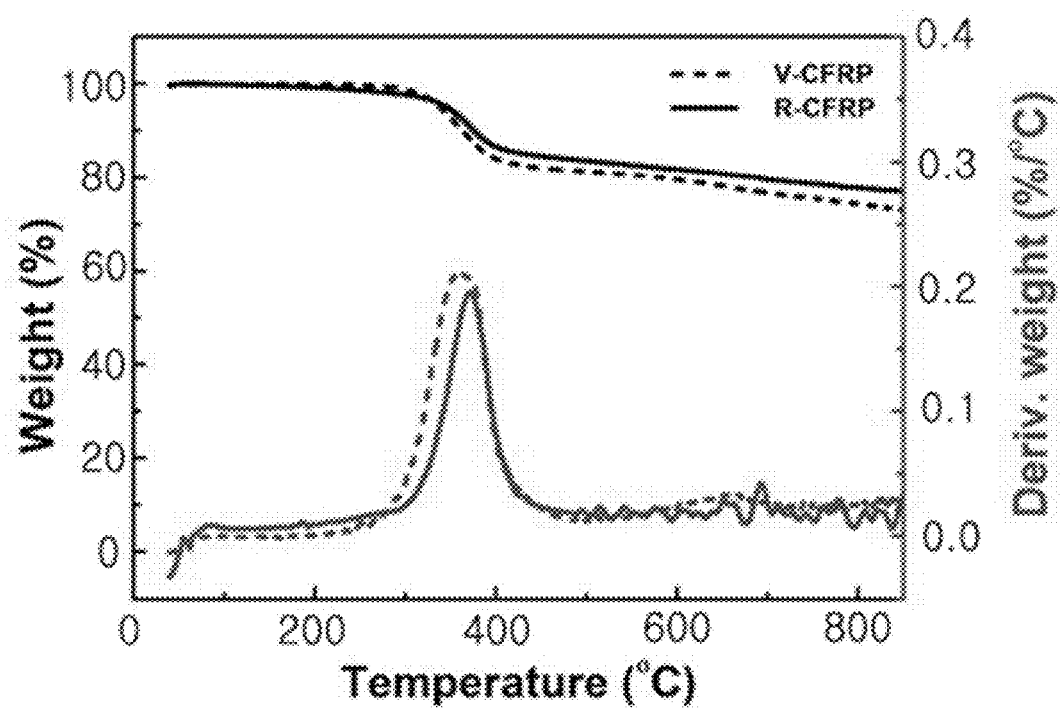
FIG. 12 is a graph illustrating results of depolymerization in Example 1 when adding a radical-providing additive thereto in Experiment 3.

The results of thermogravimetric analysis of the recovered carbon fibers are shown in FIG. 12. In addition, the following formula is used to calculate the decomposition ratio of the cured epoxy resin material from a variation in weight at 300-400° C. in the results of thermogravimetric analysis. The results are shown in Table 9.

Decomposition ratio (%)=[Epoxy resin content in CFRP (%)−Epoxy resin residue after depolymerization (%)]/Epoxy resin content in CFRP (%)

Comparative Example 1: Decomposition of Cured Epoxy Resin Material, CFRP Using Aqueous Sodium Hypochlorite (NaOCl) Solution and Separation of Carbon Fiber The same waste CFRP 10.7 g as used in Example 1 of Experiment 3 is used and no sodium percarbonate ($2Na_2CO_3 3H_2O_2$) is used, unlike Example 1. The CFRP is introduced to 2.5 L of aqueous 0.4 mol/L sodium hypochlorite solution contained in an autoclave and agitated at 150° C. After 3 hours, the carbon fibers in the aqueous solution are separated and died.

Figure 13:
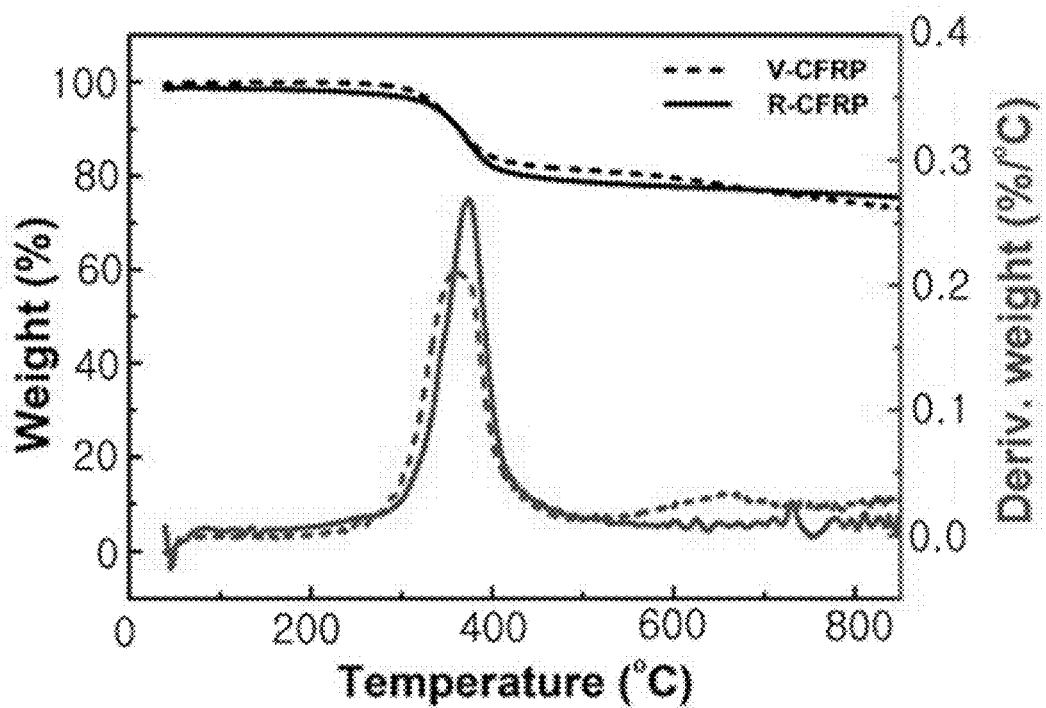
FIG. 13 is a graph illustrating results of depolymerization in Comparative Example 1 when adding a radical-providing additive thereto in Experiment 3.

The results of thermogravimetric analysis of the recovered carbon fibers are shown in FIG. 13. In addition, the same formula as in Example 1 is used to calculate the decomposition ratio of the cured epoxy resin material from a variation in weight at 300-400° C. in the results of thermogravimetric analysis. The results are shown in Table 9.

TABLE 9

|  | Example 1 | Comparative Example 1 |
|---|---|---|
| Epoxy Resin Content in CFRP | 20% | 20% |
| Epoxy Resin Residue after Depolymerization | 10% | 17% |
| Decomposition Ratio | 50% | 15% |

FIG. 12 is a graph illustrating results of depolymerization in Example 1 when adding a radical-providing additive thereto in Experiment 3. FIG. 13 is a graph illustrating results of depolymerization in Comparative Example 1 when adding a radical-providing additive thereto in Experiment 3. As can be seen from FIG. 12 and FIG. 13 and the results of Table 9, when a radical-providing additive, sodium percarbonate, is added together, the depolymerization ratio is higher by about 35%, suggesting that such a radical-providing additive may accelerate depolymerization. Thus, it is possible to reduce time and cost required for depolymerization of a cured epoxy resin material furthermore.

As can be seen from the foregoing, water alone is particularly preferable as the reaction solvent of the composition for depolymerization disclosed herein. When using water in combination with another solvent, a rapid increase in decomposition ratio occurs at a dielectric constant of at least about 65. Particularly, when using water alone, reaction time itself is decreased significantly and reaction efficiency is increased significantly.

What is claimed is:

1. A method for depolymerization of a cured epoxy resin material, comprising:
    depolymerizing a cured epoxy resin material by using a composition for depolymerization of a cured epoxy resin material,
    the composition comprising a compound represented by a chemical formula of $XO_mY_n$ wherein X is hydrogen, alkali metal or alkaline earth metal, Y is halogen, m is a number satisfying $1 \leq m \leq 8$ and n is a number satisfying $1 \leq n \leq 6$; and a reaction solvent; wherein X is capable of being dissociated from $XO_mY_n$ and Y radical is capable of being produced from $XO_mY_n$ in the reaction solvent.

2. The method according to claim 1, wherein the reaction solvent has a dielectric constant of at least about 65 or at least about 70 or at least about 75 or at least about 80.

3. The method according to claim 1, wherein the reaction solvent is a $H_2O$-based reaction solvent that comprises $H_2O$ and has a dielectric constant of at least 65 or at least 70 or at least 75 or at least 80.

4. The method according to claim 1, wherein the composition for depolymerization is an aqueous solution containing the compound.

5. The method according to claim 1, wherein the depolymerization is carried out at a temperature of 20-200° C. or 20-100° C.

6. The method according to claim 1, wherein the cured epoxy resin material is used in an amount of 1-90 parts by weight based on 100 parts by weight of the composition for depolymerization.

7. The method according to claim 1, wherein the method for depolymerization of a cured epoxy resin material further comprises repeating depolymerization by adding a new cured epoxy resin material to the reaction solvent remaining after depolymerizing the cured epoxy resin material.

8. The method according to claim 1, wherein the method for depolymerization of a cured epoxy resin material further comprises pretreating the cured epoxy resin material before subjecting the cured epoxy resin material to depolymerization in such a manner that the cured epoxy resin material has an increased reaction surface area.

9. The method according to claim 8, wherein the pretreatment is physical pretreatment, chemical pretreatment or a combination thereof.

10. The method according to claim 9, wherein the physical pretreatment is at least one selected from the group consisting of dry crushing and wet crushing.

11. The method according to claim 9, wherein the chemical pretreatment is carried out by dipping the cured epoxy resin material into an acidic composition.

12. The method according to claim 1, wherein the method for depolymerization of a cured epoxy resin material further comprises preparing the compound represented by the formula of $XO_mY_n$.

13. The method according to claim 12, wherein the compound represented by the formula of $XO_mY_n$ is HOY (wherein Y is halogen), and an aqueous solution containing HOY compound is prepared by bubbling Y gas in water.

14. The method according to claim 12, wherein the compound represented by the formula of $XO_mY_n$ is XOY (wherein X is an alkali metal and Y is halogen), and an aqueous solution containing XOY compound is prepared by electrolyzing XY in water.

15. The method according to claim 1, wherein the method for depolymerization of a cured epoxy resin material comprises forming a compound represented by the formula of $XO_mY_n$ in a reactor for depolymerization of a cured epoxy resin material, and carrying out depolymerization of the cured epoxy resin material.

16. The method according to claim 1, wherein the compound represented by the formula of $XO_mY_n$ is sodium hypochlorite (NaOCl), and the method comprises forming sodium hypochlorite (NaOCl) from a mixture of sodium hydroxide (NaOH) with chlorine ($Cl_2$) in a reactor for depolymerization of a cured epoxy resin material, and carrying out depolymerization of the cured epoxy resin material.

17. The method according to claim 1, wherein the composition for depolymerization further comprises a radical-providing additive capable of accelerating radical production of $XO_mY_n$.

18. The method according to claim 17, wherein the radical-providing additive is at least one selected from the group consisting of radical-containing compounds or compounds producing radicals in a reaction system.

* * * * *